Aug. 29, 1939.  R. H. ROBINSON  2,171,223
RACKET FOR TENNIS AND BATTING GAMES AND METHOD OF MANUFACTURING SAME
Original Filed June 15, 1931    6 Sheets-Sheet 5
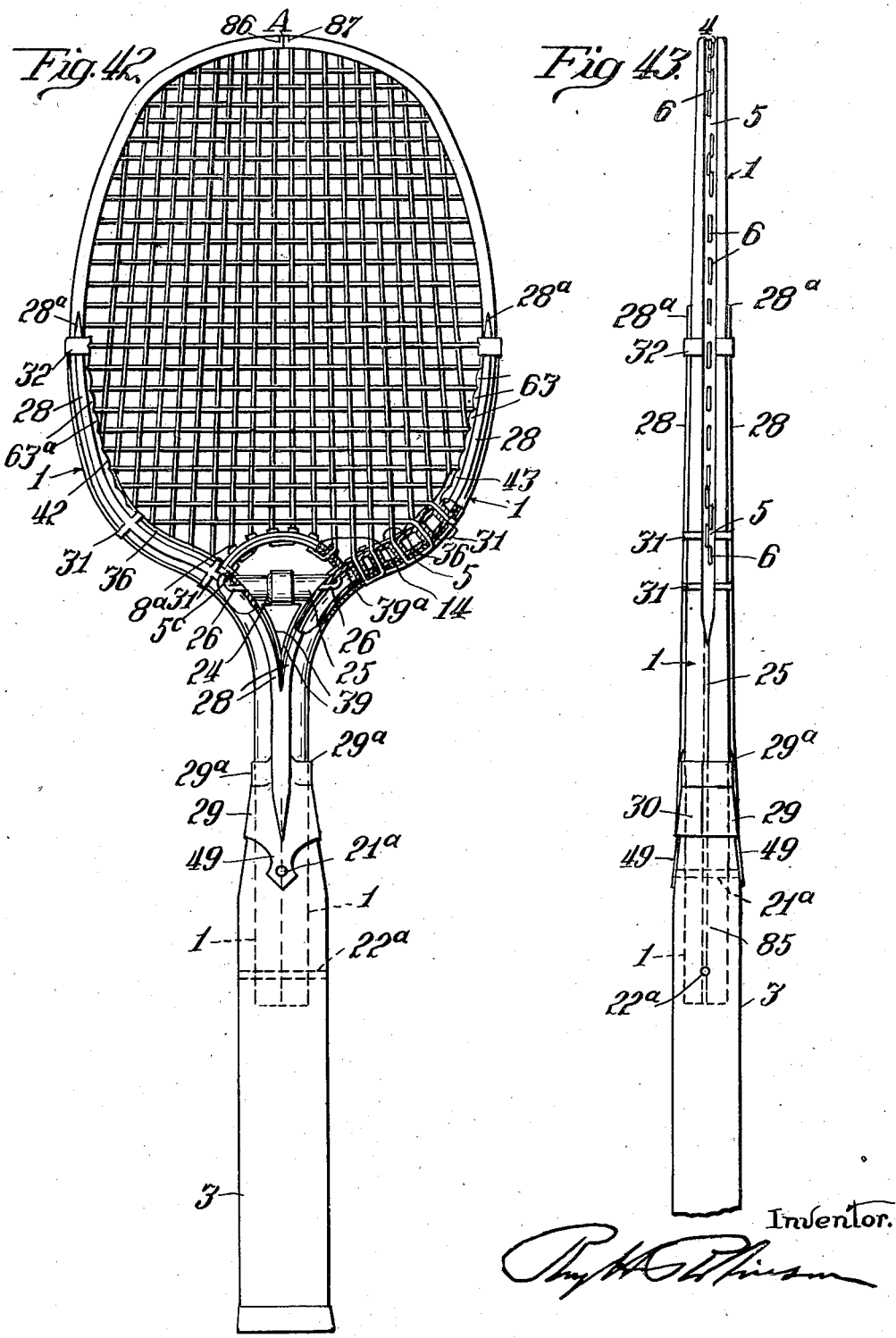
Inventor.

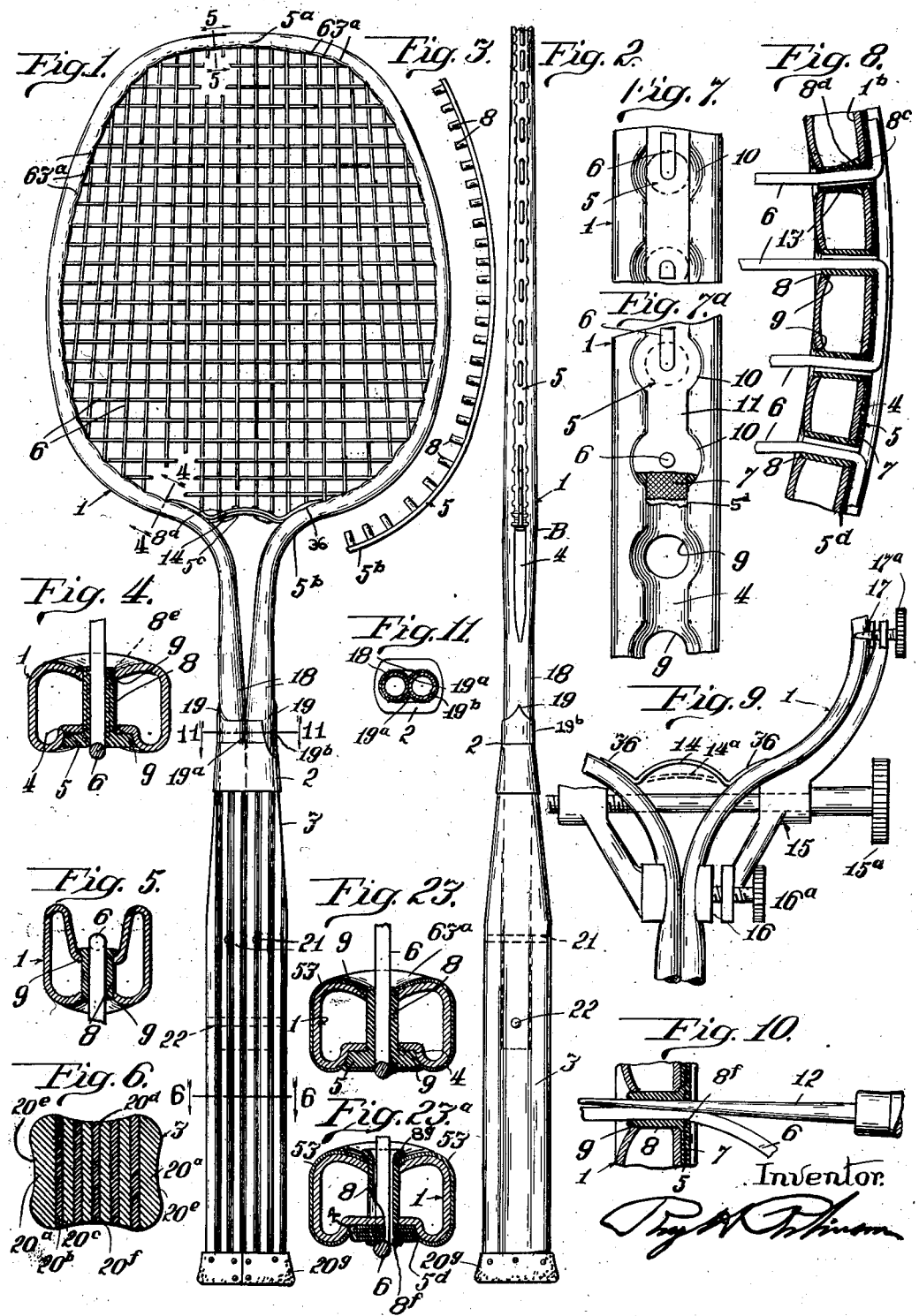

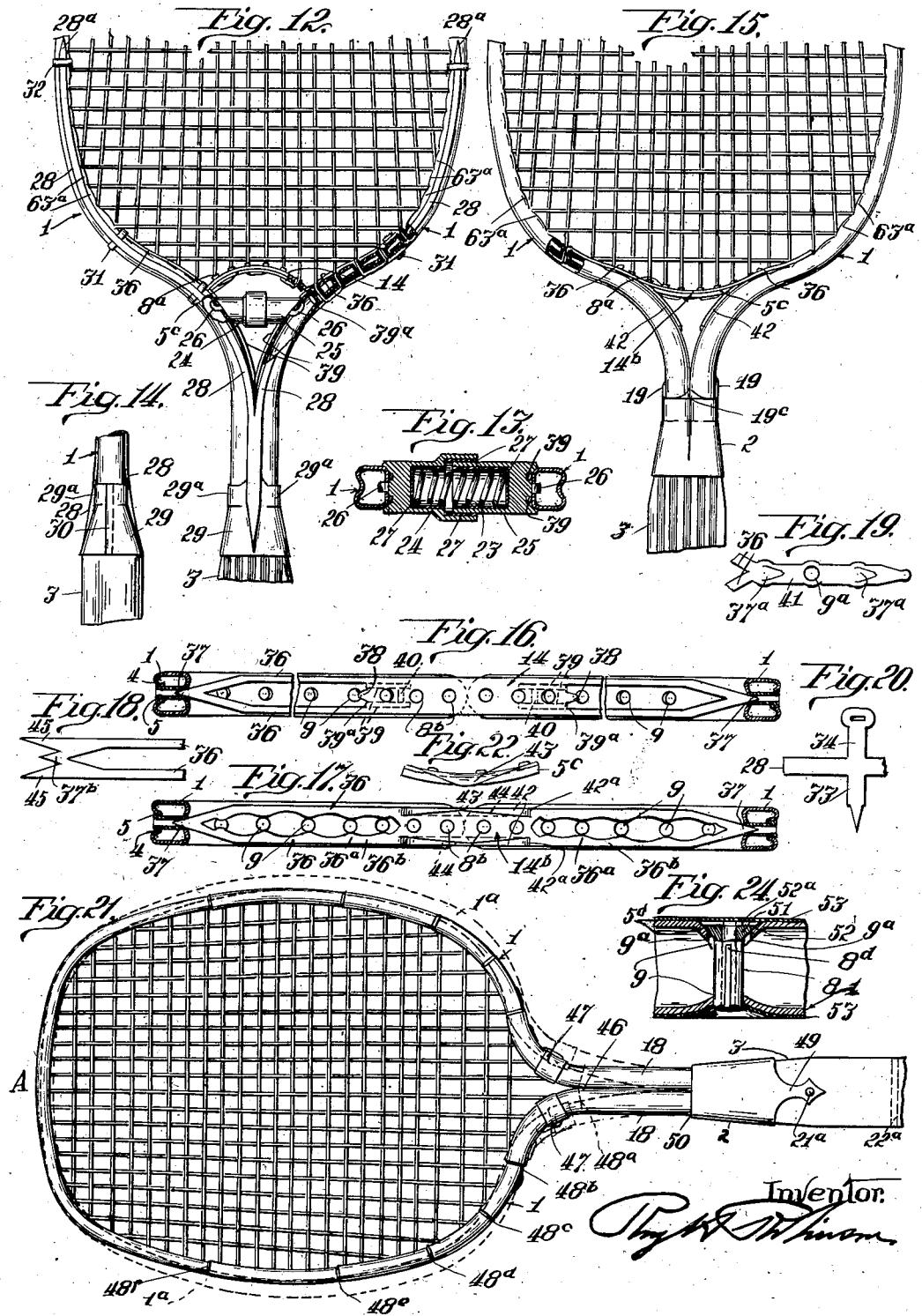
Aug. 29, 1939. R. H. ROBINSON 2,171,223
RACKET FOR TENNIS AND BATTING GAMES AND METHOD OF MANUFACTURING SAME
Original Filed June 15, 1931 6 Sheets-Sheet 2

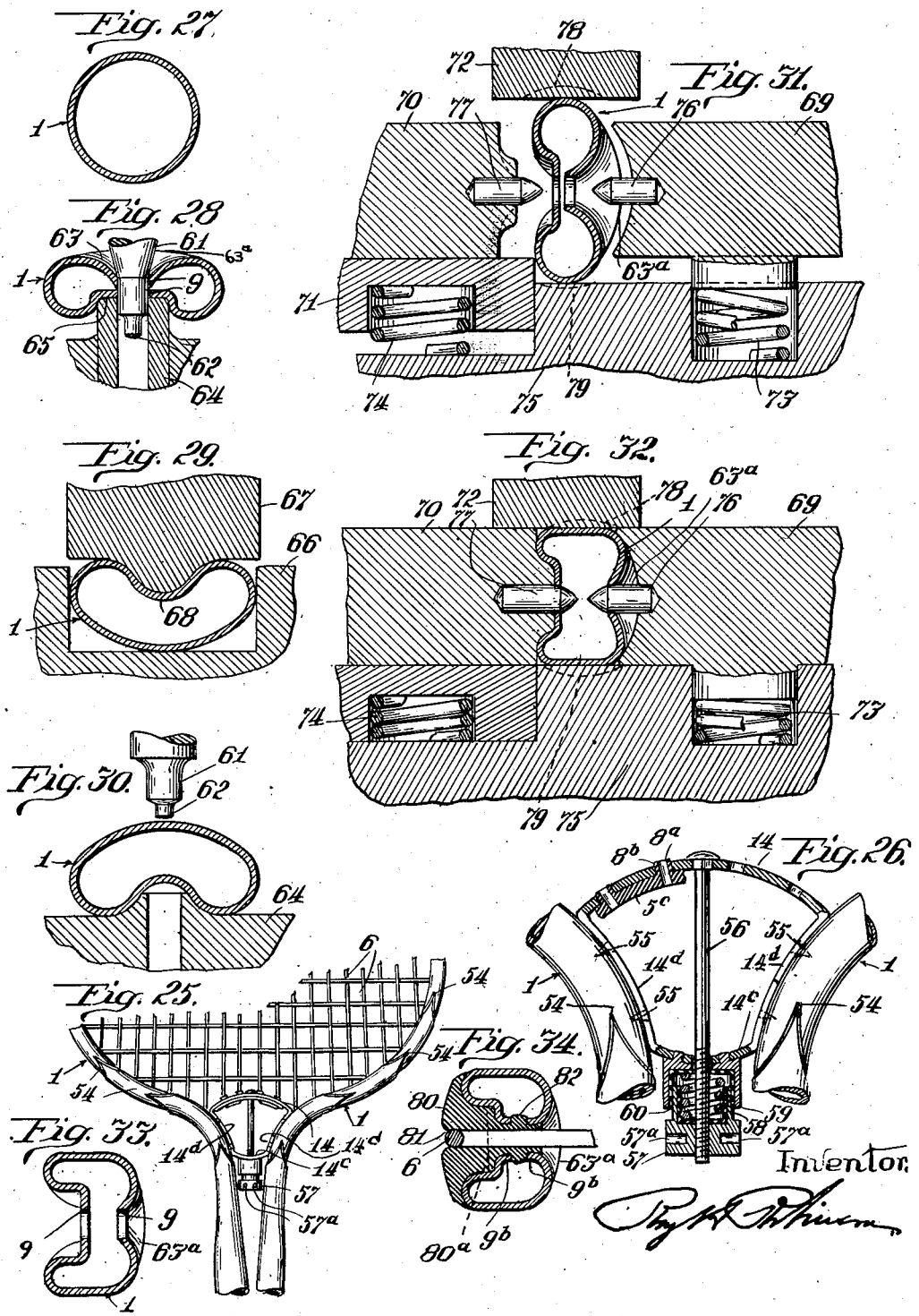

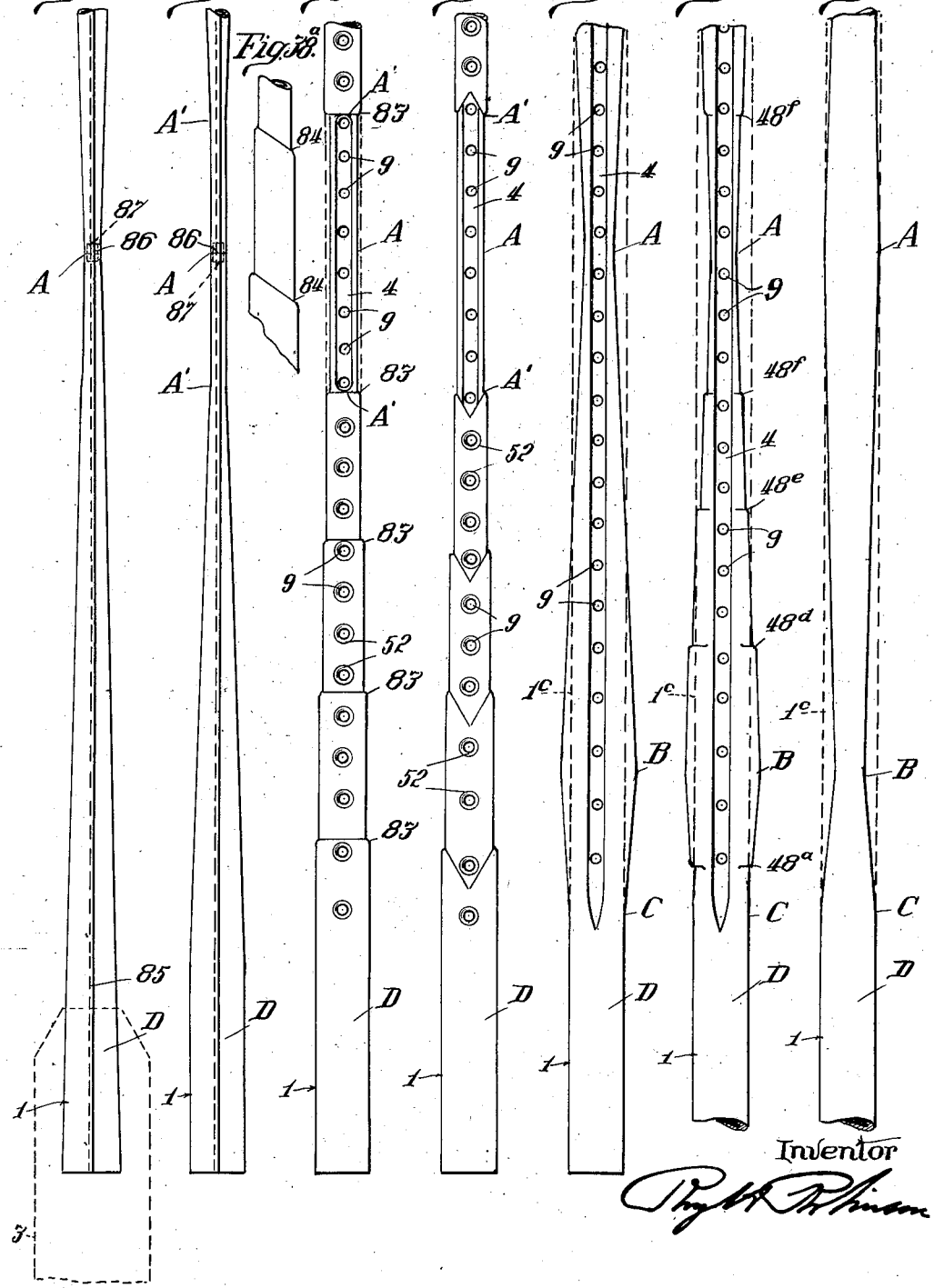

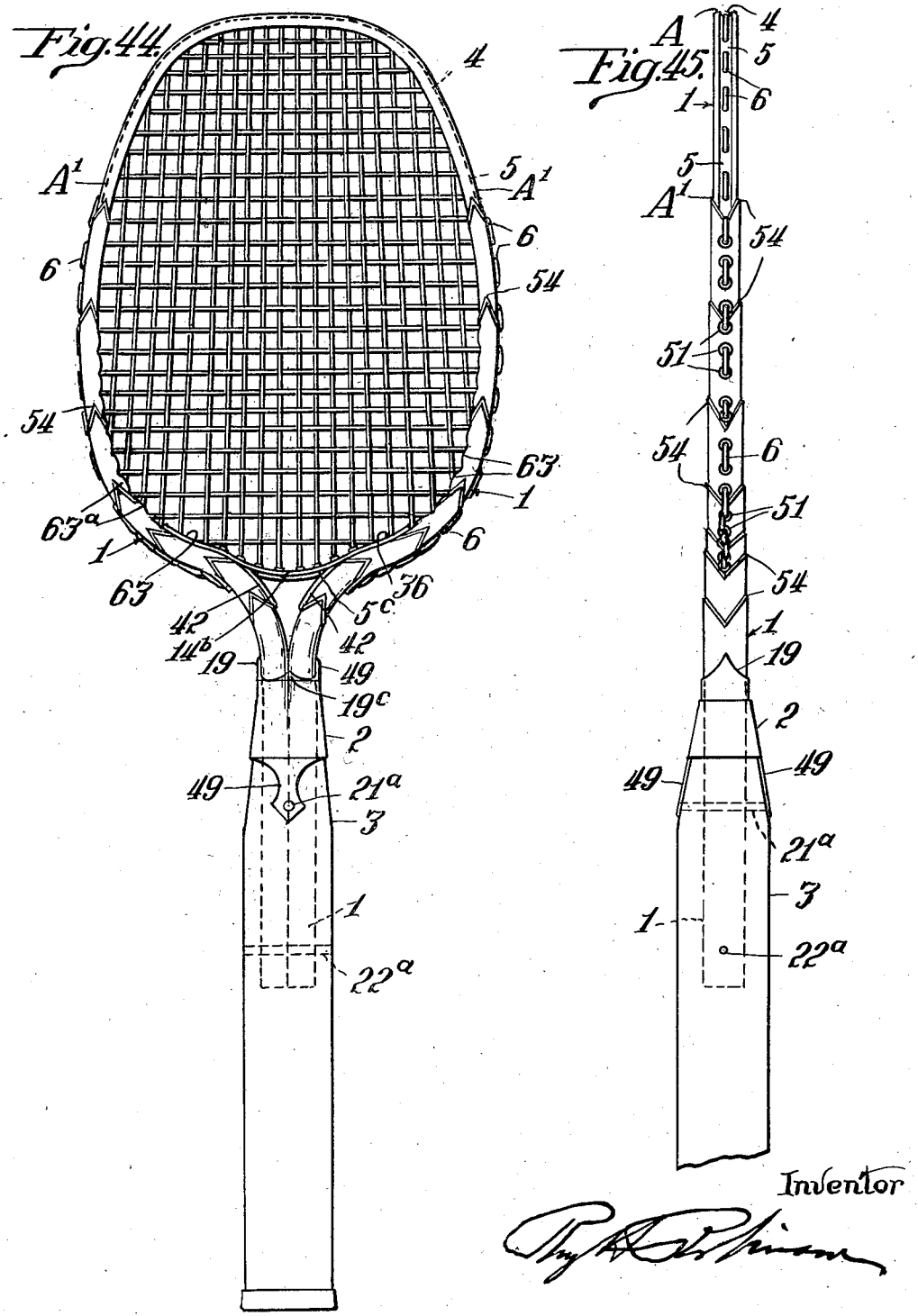

Patented Aug. 29, 1939

2,171,223

UNITED STATES PATENT OFFICE 2,171,223

RACKET FOR TENNIS AND BATTING GAMES AND METHOD OF MANUFACTURING SAME

Roy H. Robinson, Chicago, Ill.

Substitute for abandoned application Serial No. 544,361, June 15, 1931. This application December 2, 1937, Serial No. 177,832

52 Claims. (Cl. 273—73)

This invention, covered by this application, which is a substitute for applicant's abandoned application #544,361 filed June 15, 1931, relates to rackets strung for tennis, squash tennis, racquets, badminton and kindred games, and more particularly to those which are provided with a tubular and particularly a metal frame, and has for its primary object, the improvement in the method of manufacturing same, and the obtaining of exceptional resilience in the stringing, lightness of weight, and a light head for securing the balance particularly demanded by present day players.

The purpose of the invention, furthermore, is to secure a maximum of speed in play, by combining highly resilient and preferably non-metallic stringing in a metal frame in such manner as not to injure the stringing, and at the same time, permit the exceptional tautness, and to greatly augment the resilience of the stringing by supplementing this with an added resilience in the reaction of the frame itself in returning the balls off the stringing.

The invention furthermore, consists of certain novel improvements or variations in the construction disclosed in my prior Patents #1,470,878 of October 16, 1923; #1,676,051 of July 3, 1928; in my formerly co-pending applications Serial #170,777 filed February 25, 1927; #284,981 filed June 13, 1928; and #366,131 filed May 27, 1929, maturing into Patents #1,862,581 issued June 14, 1932; #1,937,787 issued December 5, 1933; and #1,930,285 issued October 10, 1933, respectively, as well as embodying other features which improve the racket, simplify the construction, and greatly facilitate the speed and economy of manufacture.

Because of its high strength-weight ratio in meeting the great variety of stresses to which the frame of a tennis racket is subjected, successful metal frames employed in the game are generally formed of metal tubing. The difficulties of forming and fabricating tubing are well known and peculiar to its hollow formation. In small thin walled tubing, required by the weight limitation of tennis and other rackets, this work is peculiarly difficult and expensive.

Hitherto, it has been found necessary to bend the tubing into the oval, round or curved racket head before forming the holes for receiving the stringing, otherwise the tube buckles and stretches at the holes in the bends, the holes being distorted by buckling on one side and stretching on the opposite side of the bent tube. Because of this and the very small size of the tubing, it has been found necessary after bending the tube to drill or spin the holes in individually at relatively great expense, as compared with punch press work, not feasible under these old methods.

One of the primary objects of my invention is to provide a means of fabricating metal tubing for the curved racket heads, whereby a large portion of the fabricating is press work, and to provide a method whereby the stringing holes in the tubing can be formed while the tubing is in the straight and in a single punching operation.

A further object of my invention is to so shape and form the tubing as to allow the use of a very thin tube wall to secure the desired light weight in the head of the racket, and at the same time, successfully resist the tremendous torsional strains of exceptionally hard hitting and yet permit the stringing holes in the tubing to be larger than customary in order to accommodate both the strings and my protective stringing guides, which protect the string from the abrasion, metal strain or cutting and permit the use of gut, silk, or other non-metallic stringing, the use of which is not successful or feasible in the present metal frame rackets on the market. These larger holes for string guides in the tube weaken the frame and so provide a problem which I successfully meet.

A further improvement provided by my method of manufacture is to permit sharp bends or turns in the metal tubing forming the racket head, whereby a smaller, yet more efficient playing area is secured in the racket head eliminating waste or dead space of little use in hitting the ball. I so reduce the length of the stringing span not only making the strings faster, but procuring a great saving in the cost of the gut, which in the longer lengths is relatively much more costly. I likewise so reduce the air resistance in playing the racket, by so eliminating the useless areas found in wooden and present day metal rackets, where the sharp bends in the wood frame or metal tubing are not feasible or desirable from a manufacturing standpoint.

A further object of my invention is to provide ways and means for stringing the racket head to secure a maximum tautness and resilience in the stringing and subsequently take up any "give" occurring in the non-metallic stringing supports and guides, or the slackening of the stringing due to age, play, or other causes; and likewise to provide a desired and relieving "give" to the stringing when it is too greatly strained by weather conditions or play, or by the spring reactions of the frame.

A further object is to provide light weight string guides and supports for protecting the stringing from the metal frame, which are easily removable and replaceable when desired in restringing the racket frame at any time.

A further object is to provide a handle and ferrule construction of unusual and attractive appearance combined with great strength and security in its attachment to the metal frame.

A further object of my invention is to so shape and reinforce the metal parts of the racket frame as to gradually distribute the abrupt stroking stresses and so avoid snapping the frame, and to strengthen the racket at the points of inherent weakness or greatest stress and to add resilience and whip to the frame thereby.

The invention consists of these and other novel features, which will be brought out in the following description.

In the accompanying drawings:

Fig. 1 is a plan view of a racket built in accordance with the invention.

Fig. 2 is a side elevation of the racket.

Fig. 3 is a fragmentary side elevation of the string supporting strip for insertion in the racket frame.

Figs. 4 and 5 are sectional views of the racket frame taken on the section lines 4—4 and 5—5 of Figure 1.

Fig. 6 is a sectional view of the handle on the section line 6—6 of Figure 1.

Fig. 7 is a fragmentary elevation of the racket frame and details of the stringing strip.

Fig. 7a is a fragmentary elevation showing an alternate form of stringing strip.

Fig. 8 is a fragmentary sectional plan view of the frame and stringing strip.

Fig. 9 is a fragmentary plan view of the frame in the process of being contracted by clamp for stringing.

Fig. 10 is a sectional view of a stringing hole with the awl temporarily holding the stringing during process of stringing.

Fig. 11 is a sectional view through the upper portion of the ferrule securing the handle on section line 11—11 of Figure 1.

Fig. 12 is a fragmentary plan view of a modified form of the racket embodying a special recoil spring.

Fig. 13 is a sectional view of the recoil spring shown in Figure 12.

Fig. 14 is a fragmentary side elevation of the racket showing the ferrule arrangement of Figure 12.

Fig. 15 is another fragmentary plan view of another modified form of the racket.

Fig. 16 is a plan view of a spring bridge piece.

Fig. 17 is a plan view of another form of the spring bridge piece.

Fig. 18 is a fragmentary plan view of an alternate end construction of the spring bridge piece.

Fig. 19 is a fragmentary plan view of a frame reinforcing end for the spring bridge piece.

Fig. 20 is a fragmentary plan view showing the construction of the stamped ring anchorages of the stamped reinforcements employed in the racket Figure 12.

Fig. 21 is a plan of another form of the racket.

Fig. 22 is a fragmentary elevation of the central portion of the spring bridge shown in Figure 17.

Figs. 23 and 23a are sectional views of the frame of the racket showing different arrangements of sheathing and string cushioning.

Fig. 24 is a fragmentary sectional plan view of a modified form of string guide with a sheathed racket frame.

Fig. 25 is a fragmentary plan view of a modified form of spring bridge, recoil spring, and racket frame.

Fig. 26 is a fragmentary sectional view of the bridge and recoil spring shown in Figure 25.

Fig. 27 is a fragmentary sectional view of tubing used in forming the racket frame.

Fig. 28 is a fragmentary sectional view showing method of punching the tubing.

Fig. 29 is a fragmentary sectional view showing method of channeling the tubing before punching, when desired.

Fig. 30 is a fragmentary sectional view showing position in which the prechanneled tube is punched.

Fig. 31 is a fragmentary sectional view showing the position of the punched tubing in the final molding die after bending and before flattening or molding.

Fig. 32 is a fragmentary sectional view showing the section of the racket frame in the molding or flattening die after the molding operation is completed.

Fig. 33 is a cross sectional view of a racket frame showing the regular form of the string guide holes produced in the frame.

Fig. 34 is a cross sectional view of a frame showing an alternate form for the string guide holes and also a special stringing strip for padding the end of the racket frame in squash and certain indoor games.

Fig. 35 is a fragmentary plan diagram of exaggerated proportions showing the plan view (in the straight) of a piece of tubing of constant diameter, and the relation of the varying widths of its face when formed to a racket head such as used in Figure 1.

Fig. 36 is a fragmentary elevation diagram corresponding to Figure 35 showing the side elevation of the same piece of tubing, and the relation of the varying depths of its sides as formed for a racket of the type of Figure 1.

Fig. 37 is a fragmentary elevation diagram similar to Figure 36 showing a side elevation of the piece of tubing when stepped off on its top and bottom faces (in lieu of graduated tapering) to simulate the effect of a stepped racket frame of the type in Figure 21.

Fig. 38 is another similar fragmentary elevation diagram indicating the side elevation of another racket frame tube, shown in the straight, where the tubing is of varying diameters, stepped up at spaced intervals, the stepping completely encircling the tubing at right angles to the tubing axis.

Fig. 38a is a fragmentary plan view diagram of an alternate diagonal stepping, in lieu of the right angle stepping shown in Figure 38.

Fig. 39 is a fragmentary elevation diagram similar to Figure 38 with the exception that the stepping instead of being formed squarely or diagonally on the tubing, is formed with converging V lines on opposite faces.

Fig. 40 is a similar fragmentary elevation diagram showing straight and tapering lines in a formed seamed tube of varying diameter for a racket frame (shown in the straight).

Fig. 41 is a similar fragmentary elevation diagram of a seamed tubing similar to that shown in Figure 40, where the form, however, is a straight taper from each end to the center of the racket frame tubing (as shown in the straight).

Fig. 42 is a plan view of one form of the racket.

Fig. 43 is a side elevation of this form of the racket.

Fig. 44 is a plan view of a modified form of the racket.

Fig. 45 is a side elevation of this modified form of the racket.

Referring in detail to the drawings, Figure 1 represents the racket, the frame 1 of the racket head being of tubular formation. The walls of the tube may be of either metal or non-metallic material, but it is preferable, in order to secure the smallest section possible and thereby reduce the air resistance in play to the minimum, to use steel alloy of exceptionally high tensile strength and resiliency with pronounced resistance to metal fatigue, the physical properties being developed by heat treating and drawing. The tubular frame is preferably so shaped as to taper in thickness, from a minimum thickness at the outer end of the racket head where in hitting, the strain in relation to frame depth is the least, to a maximum thickness at the throat end of the racket, where due to the greater leverage of the racket blow and the weakening occasioned by necessary stringing holes, the tubular frame is so formed to a maximum depth or thickness to meet these conditions. The frame thickness is then preferably graduated back to its normal size in the shanks of the racket prior to entering the ferrule 2 and handle 3 and to a round cross section, so that the handle can be bored or shaped to this regular circular tubing with the greatest convenience,—the round tubing preferably maintaining a regular untapered shape throughout its length within the wooden handle. Either straight or a partially tapered tubing can be used in shaping the frame to conform to the above provisions.

The tube itself is channeled on the outside, the channel 4 preferably, though not necessarily, extending from the outer end all the way down the racket head so as to finally die out at the shanks below the sharp curve of the throat, but above the ferrule as indicated in Figures 1 and 2. The channel, however, can be continued the full length of the frame tubing down into the ferrule, or on the other hand, stopped part way down the sides of the head, if so desired as will be subsequently noted. It is essential, however, for the protection of the stringing, that the channel at least continue across the outer end of the head and far enough down the sides, so that in any case the stringing is protected from hitting the ground. It will be observed that in accordance with the sections, Figures 4 and 5, the channel is relatively very deep at the outer end of the racket head where the stringing must be particularly protected, while at the inner end where this protection is not required, the channel is shallower in depth.

The stringing in the racket head is supported on and woven through a string supporting and protecting strip 5, which lies in the channel 4. This string support maintains the racket strings 6 away from the cutting edges or abrading surfaces of the metal frame, in accordance with my previous patents and applications noted, so as to permit the use of delicate and highly resilient gut stringing, and relieve momentary and excessive strains on the strings, and deaden the vibrations, which would otherwise be imparted from the stringing to the metal frame and thence to the handle. This string support is composed preferably of a small fabric tape 7, which is impregnated with a suitable molding material, thermoplastic or otherwise, which forms with the textile base a relatively thin and narrow band of insignificant weight, preferably only $\frac{1}{16}''$ to $\frac{1}{32}''$ thick. This band, in the molding or forming, has provided on its inner face projecting bosses, nipples or stringing guides 8, of varying lengths and spread on varying centers, those at the outer end of the racket where the channel for receiving the stringing strip is preferably deep, being short, while those at the throat end of the racket where the channel is shallow, being correspondingly longer, and the intermediate ones suitably graduated, and in all cases being such that when the strip is inserted in the channel of the racket frame, the nipples project through corresponding holes 9 formed in the tubing for the stringing and center properly therein.

The metal tube has these nipple holes 9 formed in its opposing walls for the stringing and the nipples of the string supporting strip extend through the apertures, preferably just beyond the cutting edges of the inner holes 9. The stringing is woven through the stringing strip and nipples and is thereby protected so that regardless of the angle at which it turns in coming out of the frame, it is secured from contact with the wearing edges of the metal.

As a result of my preferred method of fabricating a racket out of tubing and forming the stringing holes by means of a punch press, as will be later described, the channel 4 has a flattened circular enlargement around each nipple hole formed by the punch die. The more elaborate form of stringing strip Figure 7ª is molded to conform to these circular enlargements 10 about the holes, thereby giving the strip at the holes greater strength in all directions to resist the pressure of the awl, etc. in stringing, while between these disc like portions 10, the band is narrowed to a minimum 11 to make possible the use of a minimum amount of material with corresponding minimum weight, the saving of which is so important in the head of the racket. In my simpler form of stringing strip Figure 7, it is not necessary to have these extending disc portions and the band 5 can be run in a straight narrow strip the width of the imbedded fabric 7 and sufficiently wider than the stringing hole as to prevent the strip breaking at the holes.

It will be understood that in stringing a racket, each transverse string is pulled tight under great pressure and then held in place by forcing an awl 12 into the stringing hole as in Figure 10, the awl then holding the string by wedging it against the walls of the stringing strip until the string is woven back into the next hole and then similarly held again on the other side of the frame by another awl. One of the main purposes of the fabric base of the stringing strip is to prevent the molded material composing it from cracking or splitting when the awl is wedged into the hole, as well as to later similarly prevent the strip from breaking up from the great strain of the stringing itself. Where it is also desired still further to reinforce the walls of the nipples or stringing guides with the textile material, the fabric band 7 can be folded so as to extend down and up in each nipple in conjunction with the molding or impregnating process, as indicated at 13, Figure 8. The string supporting strip 5 can be formed out of various materials suitable for holding the strings without injury to them. The material must be hard enough not to give noticeably after the racket is strung, which would cause objectionable loosening of the stringing. It should preferably be about as hard as fibre or wood and can be molded out of materials such as formed with a combination of phenol and formaldehyde, or hard rubber (not vulcanized), or various other suitable plastic compounds. Rawhide can also be formed for the purpose, but from a manufacturing or economic standpoint, is not as desirable.

It will be understood that the molds for these formed strips are made in exact conformity with the racket frame. Each racket frame, as will be seen later, comes from a mold, which makes them all identical for receiving the correspondingly molded stringing strips. The opposite sides of the racket frame are also molded to conform identically so that a standard stringing strip will fit correctly in either half of the racket head with proper conformity. The stringing strip for the racket is so preferably made for half the length of the racket from the point $5^a$ to $5^b$, Figure 1 and Figure 3, so that two of the molded strips completely encircle the sides of the racket frame for the stringing as indicated, the ends meeting at $5^a$ between the central longitudinal strings. Where desired, however, the strip can be divided or cut into shorter lengths or as many pieces as wanted so as to include any desired number of nipple holes. Another feature of the particular thinness of the band 5 is to furthermore permit of sufficient flexibility in the band to permit easy insertion of the nipples in the metal holes of the tube when the band is being inserted in the channel 4 of the sharply curving racket frame. The stringing strip can be molded straight and flexed in placing, but is preferably molded to the exact curves of the racket head as noted in Figure 3, but even so it must be flexible for insertion of the nipples in the holes of the frame.

When the racket is ready to receive the stringing strip within its channel, a thin coating of cementitious material $5^d$ is placed either on the metal frame or on the contacting face of the stringing strip in the preferred procedure and the stringing strip forced firmly into this mastic bed and held securely so that it becomes rigidly and permanently fixed, bearing solidly against the metal at all points. This is of particular importance so as to prevent the string support giving after the racket is strung and so allowing the strings to loosen. By this arrangement, a solid base at all points is secured for the stringing,— the cementitious or mastic material filling all interstices,—and this thereby insures permanently tight stringing. The rackets so equipped with the stringing strip can be strung and restrung repeatedly, but when it is desired, after a number of stringings, to secure again the entire effect of a new racket in restringing the frame, the old stringing strips can be removed and new stringing strips inserted in the racket frame, so that the life of the racket can be indefinitely lengthened.

Where it is unnecessary to have the stringing strip 5 easily removable, the strip can have all or some of the extending nipples provided with grooved locks $8^c$, Figure 8, cut or formed on opposite sides of or completely encircling the nipples, directly under the inner face of the stringing strip, and in the preferred form, the nipple wall can be molded with an extending wedge shoulder $8^d$ to form these grooves and to strengthen the lock. The nipples in connection with these grooved locks are designed to be sprung into place in pushing them into the holes 9 of the tube so that the walls of the nipples 8 are compressed and forced back until they spring back and lock the metal wall $1^b$ of the tube in the grooves $8^c$, securely anchoring the nipples tightly in place and preventing them pulling out. By giving these grooves a tight or driving fit, the nipple can be forced into a very close connection with the tube walls so as to minimize any possible subsequent loosening or slackening of the strings and the nipples.

In the corner portions of the frame, or any other points where two strings enter a single hole, I preferably make the stringing hole in the nipple of a larger diameter as indicated by the dotted line $8^e$, Figure 4, using a hole of smaller diameter in the other nipples which have to accommodate but a single hole. This permits driving in the awl as in Figure 10 with greater ease and with less risk of cutting the strings, and also facilitates the stringing work.

The racket at the throat is left open between the shanks as noted and is provided with the highly resilient spring and stringing innovations introduced in my prior application #284,981 maturing into Patent #1,937,787, issued December 5, 1933. In this instance, I have, however, added a further alternate development in my spring bridge by stamping the spring element 14, which automatically expands the throat, out of a flat steel spring and instead of passing the central longitudinal strings through this spring bridge to anchor in the shanks of the tubular frame, I have provided for their anchorage in the spring bridge itself. The spring bridge element 14 expanding the open throat is provided with a flexible string support $5^c$ of similar construction to 5, but conformed to the width of the steel spring band 14 and having shallow nipples $8^a$ projecting through receiving holes in the spring band of sufficient length to protect the strings from the metal edges. The body of the molded string support $5^c$, it will be noted, is thin and flexible, so that when the spring bridge is flexed in stringing and play, as will be described, it will likewise flex with the spring.

It will be observed that the open throat and racket head in conjunction with the spring bridge is designed to be contractable, and with this idea in mind, the racket is inserted, preparatory to stringing, in a special vice 15, Figure 9, the vice being designed to contract the throat and head of the racket at will. This can best be done by tightening the frame at the throat as indicated with the grips 16 of the clamp and again at a point further up the sides of the racket head well above the throat as indicated by the grips 17, which grip the opposite sides of the racket head. Both 16 and 17 can be operated independently by any suitable clamping means as $16^a$ and $17^a$, or both can be similarly clamped jointly by $15^a$.

In the Figure 1, I have provided the spring bridge 14 with an upward arc. In such case, I clamp inwardly the throat of the racket at 16, prior to the commencement of the insertion of the longitudinal stringing. This forces the spring arch 14 upward from the original dotted line position $14^a$ into a sharper curve as noted in Figure 9. With the spring arch 14 so raised and the throat and head of the racket contracted by the lower clamping 16, the longitudinal stringing is then woven in and pulled up tight in accordance with customary stringing practice. At this point, I then prefer to further tighten the clamp at 17, bringing the sides of the racket head inward and forcing the outer end of the racket head outward. This brings about a still greater tightening of the longitudinal stringing, far greater than can be attained by the stringer in pulling up by hand the longitudinal strings in the regular way. With the head and throat of the racket so contracted and the longitudinal stringing given this extra super-tightening, the transverse stringing is then strung in, in accordance with the regular practice. The racket being thus completely strung, the clamp 15 is entirely released.

It will be seen that the highly tempered spring racket frame and throat immediately attempts to regain its normal position. The tempered steel alloy tubing forming the open throat and racket head sides attempts to fly back into its former place and the powerful tempered steel spring bridge works in conjunction with same and to the same purpose, trying to regain its normal flatter arch position, thereby pushing out the sides of the racket and expanding the head. The stringing will now be not only abnormally tight, but abnormally tense and resilient on its spring anchorage at all sides, ready to receive and return the ball with much greater speed and resilience than otherwise, as the entire spring frame has been set to act jointly with the stringing. At the same time, the softer string supporting strip 5 and 5c relieves the strings from the powerful spring metal strains at points of greatest stress, which may develop, and from the shock of sudden impact by having the proper amount of give and resilience in its own body. The central longitudinal strings, which receive the greatest shock and strain in the racket, are relieved at the moment of ball impact on the stringing, by the spring arch 14 contracting and momentarily "giving" to the strings as the stress is increased, only to then fly back in position, the stringing thus working after the manner of a bow string in archery, the strings being "whipped" by the spring frame and bridge in addition to their own resiliency.

It is essential in connection with this highly developed spring action as set forth in my previous application #284,981 maturing into Patent #1,937,787, issued December 5, 1933, that the shape of the racket head be so formed that its sides cooperate to sustain these spring leverages without undue collapse at different points of the head. It is also essential that similarly the racket head should not lengthen unduly or permanently from the intense stresses of the tight stringing or that in lengthening it should not bow out to a point at the centering of its tip and the racket head lose its proper shape. All of these faults of distortion occur in the common wooden racket, particularly in the standardized pointed oval head, while the curve of the wood at the throat or shoulders of the racket head, necessitated by the limitations of the material, is so gradual as to make with the sides of the frame a flat arch, which would cause the sides of the racket head to collapse inwardly if any such expanding throat action as above described were attempted.

It will be accordingly noted that the preferred form of my racket has more abruptly curved haunches at the throat than is common in other rackets which pursue the limitations and conventions of long standing wooden construction. My racket head is preferably straighter across the top or outer end, with the sides tapering in toward the outer flattened end, making the racket head preferably wider near its throat end than at the outer end and with strongly arched sides tending to more powerfully resist collapse when pushed outwardly by the steel spring bridge member 14. It will also be observed that the face or width of the tubular frame at the outer end of the racket at 5a or 5—5 as per sectional Figure 5, is preferably made substantially wider than the faces at the lower portions as for example 4—4, Figure 4. This, it will be observed, adds great strength to the arched end of the racket to resist the normal tendency of racket heads to bow outward and elongate pointedly. As a result, when the sides of the racket head are clamped inwardly and push the end of the racket head outwardly, the arched end of the racket tends to move outward as a whole, instead of elongating into the pointed arch.

It will also be observed that the stringing of my racket head is not the customary rectangular crossing of the strings. On the contrary, while the cross stringing is of the conventional parallel type, the main or longitudinal stringing is made converging. By converging the longitudinal strings into the outer end of the racket, a greater resisting force is concentrated to hold the already flattened and strengthened end section so that it goes out as a unit without "pointing" or undesirable distortion. This also tends, it will be noted, to divide the string stress among all the logitudinal strings, whereas in the other cases, the strain is generally upon a few of the central strings of the racket, which normally bear the brunt of the stringing and stroking strain and are generally the first to break.

It will be found in connection with my racket, that when the sides of the racket head are contracted by the clamps 17 as already described, the longitudinal strings of the side portions, approximately one third of the area, on either side of the racket, are the tightest, whereas those of the central area, or about a third of the longitudinal strings, are noticeably somewhat less strained. It will also be realized, in connection with the design of the racket in Figure 1 where the spring bridge 14 arches upward, that the central longitudinal strings bearing the brunt of the string wear are particularly relieved. They are anchored in the spring arch 14. This automatically springs upward on ball contact giving these strings momentary slack at the moment of greatest stress whereby the abrupt shock of ball impact is relieved. The strings are then whipped tight by the recoiling spring, shooting the ball.

In connection with the sharply turned in framing at the throat of the racket to form strong arches which will move outwardly without collapse on pressure from the spring member 14, it will be understood that the anchorage ends of the bridge spring 14, i. e. 36, conform to and preferably extend along the inner sides of these arches to form strong reinforcements which are metallically united, preferably by brazing, to the inner faces of the tubular frame. These end members 36 are formed in the stamping of the strip spring steel of any length desired, different models being finished with different lengths of reinforcing in conformity with their intended strength, weight, price, etc.

The shank portions 18 of the frame preferably converge in the termination of the open throat so as to meet in contact at or before entering the metal ferrule 2, which houses and holds them in conjunction with the wooden handle 3. The ferrule 2 is formed preferably from light sheet or steel alloy and may be of varied forms as will be noted. In one of my preferred forms shown in Figure 1, the sides of the ferrule have extending points 19. These points which are metallically united, preferably by brazing, to the tubular frame shanks are pointed to distribute the stroking shocks coming down the racket head to avoid too abrupt a change in the strength with the corresponding risk of snapping the tubing. It will be noted that the upper portion 19ᵇ of the ferrule is straight so as to closely conform to the tubing and hold same firmly within it for a definite distance. One of the purposes of this is to center and hold the loose ferrule on the tube shanks prior to brazing and heat treating so that the ferrule maintains itself in correct position for brazing and does not have to be otherwise held in position. This brazing is located between the tubing walls and the sides of the ferrule at 19 to 19ᵇ. When desired to further facilitate this holding of the ferrule in position, the central portion of the ferrule 19ᵃ is indented inwardly to conform to the sides of the tubular shanks as indicated in Figure 11 and bridge the hollow formed. The ferrule can be located at any desired distance from the head of the racket, preferably far enough down to give a desirable length to the open throat for clamping and to produce the proper whip in the shanks in hitting the ball and to give a light head to the balance of the racket, as desired. Where a stiffer action in the shanks of the racket is desired, the ferrule may be raised to points closer to the head. The head and the shaping of the shanks and the curve of the throat can be correspondingly modified to similarly conform to the higher point of location of the ferrule. When the ferrule is set at the desired point, the racket can then be inserted in a punch press which stamps in the indentation at 19ᵃ, tightly jacketing the tubing in the ferrule end and leaving it ready for the brazing at the sides, the brazing material being inserted and extending down between the tube walls and the ferrule sides at 19 to 19ᵇ as far as desired for proper strength. If desired, the ferrule and tube shanks can also be centrally brazed at 19ᵃ within the ferrule by inserting brazing material there also.

In Figure 1, the handle 3 of the racket is in laminated strips 20ᵃ, 20ᵇ, 20ᶜ, etc., of alternating layers of fibre and wood or two different woods, or other non-metallic materials glued together and rigidly held from subsequent separation by being driven into a housing formed by the tapered ferrule 2, the end of the handle and the grooves for the tubular shanks being first coated with glue or other cementitious material, and the handle driven up tightly into the ferrule. The handle is then firmly pinned in this position by pins 21. These are preferably made non-metallic, using hard fibre, which requires no concealing plugs at the ends, as is the case with metal pins hitherto in use, and which do not tend to transmit vibration in the handle, the same as metal pins. By pinning these through the front of the handle as indicated in Figure 1, each pin holding a tube separately, a very secure deep anchorage is secured not found in other steel rackets on the market, which are only pinned from the shallow wood sides. This extra security is the result of pinning each tube from the handle face separately through the thick part of the racket handle, pinning on the side of the handle not offering this thick anchorage.

The tubular frame shanks 16 extend partly down inside the handle in tightly fitting holes formed to receive them and continue beyond the point of the pins 21 any desired length. Where still further security is desired, a further cross pin 22 can then be inserted in the opposite plane at right angles to that of pins 21, this pin also being of fibre or non-metallic material, and slightly below this point the tubing can then be terminated. The handle below the tubing termination is then solid for at least part of the way as at 6—6. The outer end can be hollowed out part way up for lightening for balancing, if desired. My solid portion secures the racket handle from splitting, common among other handles on the market. In those where the tube boring is continuous and a racket handle is placed in a vice for stringing, as is customary, or receives hard usage, there is a tendency for such hollow handles to split. Where desired, I make the sides of my handles concave with rounded corners between as noted at 20ᵉ and 20ᶠ, as indicated in Figure 6, this feature giving a gripping point for the thumb and the hand bearings so that the racket does not slip and turn in stroking. The laminated material in the handle is preferably of alternatingly light and dark colored woods so as to produce a striped and handsome effect when finished, and the number of laminations can be varied to suit the taste. The laminated construction gives both beauty and strength to the handle and the pins 21 can also be located so as to be practically concealed by the stripes of the lamination. The laminated handle can be made in a solid assembled section in which the shank holes are bored from the end and the handle slipped into the frame shanks as a unit, or they may be halved and jointed at the sides or on the face. One of the features of my built up laminated handle as shown, is that the racket can be jointed on the face at 20ᵈ, instead of at the side, in which case the joint is concealed by the laminated formation when the two portions of the handle are tightly glued together about the shanks. The end of the handle is finished with the customary leather butt 20ᵉ.

In Figures 12, 15, and 21 are represented modified forms of the racket presenting certain specific advantages for particular cases. Where it is desired, Figure 12, the racket has the spring bridge 14 arched upward similar to Figure 1, but where a different reaction is desired and a different throat appearance, the spring 14ᵇ can instead be arched to curve downward as in Figure 15. Where the spring bridge so arches downward, the order of the stringing and clamping arrangement, as previously described, is slightly modified. In this instance, the clamping and contracting of the racket frame together at the throat and sides, as already described so as to reduce the size of the head and throat, forces the spring bridge 14ᵇ downward instead of upward as in Figures 12, 9 and 1, and so tightening the group of central longitudinal strings anchored in 14ᵇ. On this account, it is preferable in the racket of Figure 15 not to clamp the racket throat and sides together until the longitudinal strings of the racket are in place and pulled tight by hand. The racket is then clamped at 16 and 17, Figure 9, and the spring bridge 14ᵇ thereby pressed downward. It has already been pointed out how this clamping of the racket at 17, Figure 9 tightens the group of longitudinal strings on either side of the central area rather than the central group of strings, but in this instance, it will be observed that the forcing of the spring bridge 14ᵇ downward also gives pronounced additional tightening to this main group of central strings so that the tightening of practically all the longitudinal strings is thus secured and approximately equalized. After the longitudinal stringing has been so tightened by this clamping, the cross stringing is tightly woven in, in the customary manner already described, and the racket is then removed from the clamp, producing a super-tight racket in which the various spring elements and the spring frame are all set tightly against the stringing.

Where additional spring strength is desired beyond that of the clamp-set frame and the compressed spring bridges 14 or 14$^b$, a recoil spring member can also be inserted in the throat of these rackets to increase the spring action. Figure 13 shows in detail such a recoil spring, which can be used either with the convex spring bridge Figure 12, or the concave Figure 15. The recoil spring element has a powerfully tempered steel alloy spring 23, which operates in a compression chamber formed by the telescoping cylinders 24 and 25 which are preferably formed of aluminum, aluminum alloy, or other very light metal. These encasing members 24 and 25 have projecting lugs 26 at their ends which insert into corresponding holes found on the inner sides of the shanks of the racket throat. Where the racket frame is of steel alloy heat treated to develop the physical properties, high tensile strength, and resistance to metal fatigue, as in the preferred form of my frame, the recoil unit since it is of a light metal of lower melting temperature than the heat treating requirements of the frame, is inserted after the frame is heat treated. This can be conveniently done by spreading the throat of the racket and slipping the lugs or extending hooks 26 into the holes in the racket frame 1. These inserted arms 26 can then be bent back tightly in place by inserting a suitable tool at the open ends of the shank tubes, and the throat allowed to spring back in place, contracting the recoil spring 23 into compression. When the racket head is subsequently clamped, as already described, this recoil spring is brought to its maximum compression and is thereafter working against the string pull, to tighten the strings by spreading the frame, and to "give" on the ball impact and instantly recoil. This will greatly accelerate the resiliency of the racket on the ball. In order to avoid all noise in connection with the action of the recoil spring, the cylinder members 24 and 25 are preferably provided with a non-metallic lining 27, which can be formed of fibre or hard rubber or other suitable material. These lie between the otherwise contacting metal members so that the noise and vibration of metal contacts is avoided. Where it is desired to use steel casings instead of duraluminum or other light lower melting alloy, the recoil unit can be braced at its ends to the frame in addition to the anchorage into the frame of projecting members 26.

In my previous application #284,981, maturing into Patent #1,937,787, issued December 5, 1933, I have added great spring resiliency to the metal tubing of the frame, particularly at the throat in connection with the clamping, by brazing thin wire like members on the tubing walls of the frame. Where it is desired, these thin members may be stamped from steel alloy sheet and in connection with such procedure, I have provided, as in Figure 12, to form reinforcing members 28 on each of the two faces of the racket in one stamped piece with an enlarged end 29, which is formed into the shape of one-half of a ferrule with interlocking edges which are clinched in conventional sheet metal interlock 30 on each side of the racket so that the pair so united form a ferrule housing for the wooden handle. The face reinforcement of the frame tubing and the ferrule is thus formed out of two pieces of stamped sheet metal placed on the opposite faces of the racket, clinching the tubing tightly together at the point 29$^a$. The branching reinforcing members 28 unite in one piece below the throat and in forming the ferrule portion 29 are preferably stamped in raised relief for artistic effect, terminating in a point at the lower portion of what appears to be a separate ferrule 29, but which is the same sheet of metal. The extending reinforcing arms of metal 28 running up the tubing are held in place by rings at points 31 and 32, which can be spaced apart at any given number of points, as desired. The rings may be either separately formed rings as 32 slipped over the reinforcement 28, or they may be, and preferably are, formed integral with the sheet 28 in the stamping. This is accomplished by stamping the metal at these anchorage ring points, as indicated in Figure 20, with extending arms 33 and 34. The rings 31 are then formed by bending the arms 33 and 34 of the opposing reinforcements 28 so that the points of 33 insert into the opposing eyes of 34 and are then bent back so that the ring is clinched tightly around the tube. The reinforcement members 28 are so made tight to the tube ready for brazing, being further anchored at 29 by the clinching of the opposing ferrule members together and tightly to the tube at 29$^a$ and by the rings along their length. The entire reinforcement including the rings are thus held firmly in place for brazing and are brazed to the tubing in this position along its length and around the top of the ferrule portion without the necessity of any further anchorage. The points 28$^a$ are ground down to fade out at the end to relieve sudden strains.

In Figure 15, the ferrule 2 is of a type similar to that of Figure 1, but also has a projecting prong 19$^c$ formed on the opposite faces of the ferrule at the top, this projecting point being bent inwardly so as to contact with the tubing and cover the depression between the frame shanks as they enter the ferrule. The tube shanks are preferably in contact as they enter the ferrule.

Figures 16, 17, 18, and 19 show alternate forms for the spring bridge members 14 and 14$^b$, which can have extending ends to form spring reinforcements on the sides of the tubing as shown. These are preferably stamped from steel alloy strip and are, of course, drawn or tempered after heat treating to produce the proper spring action. In stamping them in a punch press from the steel strip, the holes 8$^b$ for receiving the nipples 8$^a$ of the stringing strip 5$^c$ are punched out and beyond the termination of the arch, the central portion of the band is stamped out so as to leave only the outer edge members 36, which form reinforcing arms which are bent to conform to the sides of the frame to which they attach to form reinforcing springs on the sides of the tubing. The reinforcements 36 preferably join together as noted at their termination and form a hook 37, which is located to anchor into the stringing hole and is bent down and backward for that purpose. In this way, the spring bridge piece with its reinforcing extensions can be quickly assembled on the frame by merely snapping the hooks 37 into the proper stringing holes, the stringing hole at such points being shaped slightly larger on one side to receive the hook 37. At the base of the spring bridge arch 14, a similar tongued hook 38 is formed in the punching, which similarly anchors into the stringing hole at that point, the tongue having been previously bent back to hook inwardly. These four hooks 37 and 38 on the spring bridge are so spaced that they spring or snap into place when the racket head and throat is very slightly contracted for that purpose. The racket frame released then expands against these hooks and holds the spring strip firmly in place ready for brazing. The parts contacting along the tube frame as 36 and all other touching points are then brazed to the tube so as to thoroughly reinforce it and give the frame great strength at the lower portion of the head, where the strains are maximum and where the greatest strength is desired for hard hitting, and where much torsion also has to be overcome. Where it is also desired to reinforce the sides of the tube framing below the bridge in the throat, as well as above it, I also stamp out the arms 39 from the metal stock between the members 36. These narrow reinforcements are then bent backward from the points 39ª and to the curve of the throat of the racket and in their stamping having preferably reinforcing connecting cross bridges at desired points as indicated at 40. These reinforcements 39 can be of any desired length as determined by the length of the metal between 36 from which they are stamped and can extend as far down the sides of the tubing in the throat as desired, either part way or preferably to the meeting point of the tubes so that they contact with each other from the opposite sides of the throat, and there press against each other so as to hold themselves firmly in place for brazing as shown in Figure 12.

Where the recoil cylinder Figure 13 is also used, the members 39 or 42 brazed to the sides of the tubing walls form a further anchorage to which the ends of the cylinders 24 and 25 can be fitted by slotting so as to strengthen the recoil cylinder against lateral dislocation.

Where it is desired to reinforce the side of the tubing frame 1 above the point where the spring member 14 or 14ᵇ terminates in the joining of the reinforcing sides 36 in the point 37 shown in Figure 16 or 17, the strip steel can be stamped with an extending member 41 continuing on at 37 at both ends as indicated in Figure 19. In such case, the reinforcement becomes a single central reinforcement on the inside of the frame, instead of the two parallel reinforcements 36. The reinforcements 41 are stamped to extend around the nipple holes 9, which they are punched to match so as to permit the nipples 8 to properly project just through them. This adds greater reinforcing at these weakest points. 41 is anchored with projecting tongues 37ª similar to 37 which are stamped and turned inwardly to hook into the nipple holes in the tube, and at the same time form the hole in 41 for the nipples 8 to project through. These anchorage hooks 37ª can be placed as often as desired and intermediate stringing holes 9ª perforated to conform to the corresponding holes 9, to which they fit on the tubing. These extended reinforcing members 41 are brazed to the tubing along their entire contacting length, the same as reinforcements 36.

In Figure 17, the construction of the spring bridge and reinforcement stamped from the flat strip steel is generally similar to that of Figure 16. It is to be noted, however, that the reinforcing extensions 36, in this case, are of varying width, the width at 36ª adjacent the stringing holes on the tubing being wider than the intervening arches at 36ᵇ, so as to more nearly equalize the strength of the reinforced tube by giving more reinforcement adjacent to the holes. To similarly still further equalize the strains in the racket head, the reinforcements 36 as they approach their outer ends graduate to a narrower width so that as the strains on the racket head gradually increase on approaching the throat, the width and corresponding strength of the reinforcement brazed to the tubing gradually increases.

The spring bridge may be of a constant width throughout, or where desired, as indicated in Figure 17, reinforcing legs 42 may be formed in the stamping process by slitting the metal at this point and hinging the members so formed downward at 42ª to conform and braze to the inner faces of the tubing in the throat as noted in Figure 15. In this way the throat tubing can be reinforced without applying separate spring members, which is more troublesome. If it is desired to further stiffen the flexible bridge 14ᵇ at its center or weakest point, the projecting faces 43 formed by the stamping and bending away of the reinforcing legs 42, can be bent downward as indicated along the dotted lines 44, forming stiffening side faces at the center of the bridge as indicated in Figure 22 between which and within which the stringing strip 5ᶜ is snugly held.

In Figure 18, the terminating end of the spring bridge and reinforcement 14 or 14ᵇ is shown with a different form of termination. Instead of having the pointed end with a tongue 37 bending back into the nipple hole of the tubing for anchorage and holding for brazing, the end is stamped to terminate with the two outer prongs 45, while a shorter inner prong 37ᵇ is stamped and bent underneath and backward after the manner of 37 to similarly anchor in the nipple hole of the frame. This arrangement is done to relieve strains concentrated at the anchorage hole in the tubing, which is the weakest point when the reinforcement starts directly out of the hole, and so provides greater safeguard against snapping the tubing at such point.

In Figure 21, I show a racket of simplified throat construction. In this case, the spring bridge and metal reinforcement strips are omitted and the framing 1 of the head formed with the open throat, the shank portions 18 of the frame, meeting in contact and there brazed together at a substantial distance below the lowest stringing holes and preferably at the point of entrance to the ferrule 2, although they may meet in the brazed union at a point higher above the ferrule.

In making the racket, it should be understood the racket frame 1 is formed to the dotted lines 1ª so that the head of the unstrung racket is wider across from side to side as indicated, while the throat forms an enlarged wide open V as indicated by the dotted lines, and not as shown in the racket when strung.

After the longitudinal stringing is woven into the frame and pulled up tightly by hand in the customary manner, the racket is then inserted in the clamp 15 in the manner already shown in Figure 9 and the shanks 18 defining the open throat portion are clamped inwardly until they touch at the point 46 as shown in the strung racket, and the sides of the head above the throat are at the same time contracted inwardly by the clamping 17, Figure 9. The longitudinal stringing is thus tightened as previously explained and the cross stringing then put in and the racket removed from the clamp 15.

The purpose of first forming the racket frame to the dotted line 1ª with the shanks spread far apart in the extra wide open throat thus formed and then contracted so that the shanks come into contact at the point 46, which is preferably close to the lowest stringing holes, is to give the frame head so contracted an exceptionally strong spring action as the tempered shanks of the frame are exerting this outward pressure on the stringing. Furthermore, it has been demonstrated by experience that in rackets of this kind, which are not reinforced with the bridge spring spanning the open throat or at least by reinforcements on the tubing of the frame as 28, Figure 12, that the repeated blows of the balls on the stringing tend to permanently collapse the open throat and so loosen the stringing, particularly in the lower portion of the racket head, if the shanks are not in contact as described. This, however, is prevented when the shanks are clamped to a contact or very close to a contact at 46, because in that position the open throat is prevented from any further or any appreciable collapse after the racket is strung in such position, while at the same time the maximum expanding force is exerted against the strings. In as much as the lowest holes for the stringing guides of the central longitudinal strings further weaken the racket frame at a highly stressed point, I provide, when so desired, broad steel alloy encircling bands or rings 47 at that point. These encircle the tubing and are brazed to the wall of the tubing, while they have holes for the stringing nipples concentric with the holes in the frame tubing and are preferably flared or turned into these holes so as to leave a chamfered hole for the stringing guide or nipple.

Where it is desired to reproduce the effect of bamboo or stepped off partridge wood, the framing of the head, as it gradually increases in depth as it approaches the throat from the tip end of the racket head, may be stepped up at desired intervals instead of giving a gradual taper. These steps are indicated at 48ᵇ, ᶜ, ᵈ, ᵉ, and ᶠ, and may completely encircle the tube or for advantages in manufacture, which will be subsequently described, appear only on the opposite faces or the front and back sides of the racket framing and fade out onto the sides of the tubing. They may be spaced apart evenly, but preferably are gradually spaced closer as they approach the throat. Below the stringing holes, the frame may, if desired, be stepped down again in thickness or complete diameter at a point as indicated by dotted lines 48ª giving a relieving "give" and whip to the shanks.

The ferrule 2 in Figure 21 is stamped with pendant projecting members 49 on its opposite faces, which form an anchorage for a handle pin 21ª, which in this case is preferably a light metal such as duralumin. It passes through the handle contacting walls of the two tube shanks 18 and rivets in the head of the pendant 49 on the opposite faces of the handle. At a point further down the wooden handle 3 is a pin preferably fibre or non-metallic 22ª, which passes through the handle and the tubes from the side at a point above the termination of the tubing in the handle and with a driving fit. The tube shanks are thus firmly pinned in two opposite planes. This order may be reversed with the pendants 49 formed on the sides instead of the faces of the handle and then 21ª is a transverse side metal pin and the pinning at 22ª is secured by two fibre face pins as 21, Figure 1.

The ferrule 2 may or may not be brazed to the tube walls at its outer end 50. It is possible, because of the method of pinning at 21ª, to apply the handle and ferrule after the racket has been heat treated and without brazing. This permits of the finishing of the handle and ferrule and slipping it on after the racket frame is completed. In such case, the ferrule may be made of duralumin or other light low fusing metal or material, as it is not exposed to the otherwise destructive heat treating temperatures necessary if steel alloy tubing is used in the frame. It is understood that the handle is glued in its housing 2 and that the shanks 18 are coated with glue in slipping the handle over them so that when the pins 21ª and 22ª are in place, the racket handle is firmly secured with anchorage pins in opposite planes.

In Figure 24 is shown a detail of a string guide or nipple for separate or single holes. In this case, the nipple is provided with a beveled or screw head 51, which fits within a countersinking 52 of the metal holes 9. The stem 8 of the nipple can be provided with projecting shoulder locks 8ᵈ similar to those of Figure 8, or as here shown, the projections may be formed merely by extending lugs on two opposite sides of the nipple, which insert through slots 9ª in the tube and are then secured by rotating the nipple a quarter turn. For the latter purpose, the slot 52ª for a screw driver is preferably formed in the screw head at right angle to the plane of the lugs, so that when locked, the slot lies in the path of the stringing, extending from hole to hole on the outside of the racket frame, the stringing thus lying in the slot and preventing the nipple turning. Where it is preferred, the two opposite slots 9ª in the chamfered metal hole may be omitted and the lock shoulder 8ᵈ formed simply by a raised screw thread on the nipple stem at that point, so that the nipple can be screwed into place and thus locked securely, and yet easily removed for replacements or other purposes. It is understood that the single string guides are also preferably cemented in place the same as the continuous stringing strips 5, the countersunk hole being coated with cementitious material 5ᵈ before the screw head is forced tightly into the hole.

It is understood, of course, that the single string guides are of similar material to the continuous string guides being formed of any suitable non-metallic material for properly cushioning and protecting the strings and deadening the transmission of vibration to the metal. Rawhide or hard unvulcanized rubber can be used, or other non-spliting plasticly formed material preferably having a textile element analogous to 12, Figure 8 incorporated therein. The single string guides are preferably inserted from the outer side of the frame, so as to be pulled inwardly against the head 51 by the stringing, and the frame where such are used is correspondingly formed and chamfered on the outer face. In the case of the two central strings, however, in Figure 21, the two last holes in the throat of the racket have the holes chamfered and the head 51 on the inside sides of the frame instead of the outside, as these strings in being pulled tight in the customary manner of stringing, pull against the nipples from the inside and at an abrupt angle.

If it is desired to omit the groove 4 from the outside of the frame except in the upper and end portion of the racket head where the strings must lie in a groove for protection, all the holes in the frame other than this upper grooved part may be countersunk or chamfered with separate string guides after the manner of Figure 24. Where stepped enlargements of the frame are desired after the manner of Figure 21 and completely encircling the tube, a pleasing effect may be obtained in using such single hole string protection, the countersunk string guide heads 5f being flush with the face of the tube and carrying out the smooth lines. In doing this, a very handsome effect may be obtained by then encasing the tubing with a thin sheathing. In Figures 23 and 24, the sheathing 53 may be a wrapping or casing of thin wood veneer, Celluloid or Pyralin composition, or any other suitable material, and may encase both the tubing and the string protecting strip 5 or countersunk heads 5f of the single string guides, and be either in the form of a jointed wrapping or a tubular sleeve drawn onto the frame. At the other end of the nipple, the sheathing preferably extends into the hole depression so that the edges of the casing material are covered and protected by the slightly projecting nipple 8, as indicated in Figure 24. If it is desired, however, to cover the nipple entirely, the casing may be extended over the end of the nipple as indicated in Figure 23, but this is less desirable in the matter of wear on the sheathing. However, if a process for Pyralin or other sheathing is employed where the sheathing coat is formed directly on the frame in a liquid or plastic condition, instead of being applied in tubular or sheet formation, the covering of the metal and cushioning elements is preferably continued into or within the holes for the stringing, leaving no exposed edges for wear or chipping. The sheathing may be utilized to form a wood or bamboo effect and at the same time hide the nature of the frame's construction in relation to the string supporting and protecting elements.

In Figure 23a is shown a modified arrangement whereby the sheathing can also, if desired, be utilized and designed to form both the ornamental finish and the protecting string support of the frame in whole or part.

To successfully conform to weight limitations of a light racket head, the sheathing must be extremely thin and light, but by lapping it in the channel 4, a double thickness, or with folded ends, additional thicknesses, for the string protective support may be supplied in lieu of the special stringing strip 5. This permits of the sheathing 53 in the case of Pyralin being formed from a flat sheet instead of a tubular sleeve, simplifying its forming and application. To avoid chipping and tearing, it is preferred in the case of Pyralin and such material, to avoid exposed edges, for which reason a tubular sleeve would ordinarily be preferred. In this case, however, by butting the flat strip edges against the wall of the sunken channel 4, or underfolding them within the sunken channel, it will be seen that this difficulty of exposed edges is obviated. The stringing holes may be punched in the Pyralin material 53 before placing it on the racket frame, a procedure which is also simplified by using the flat sheets, and after it is properly pressed in place on the frame on a cement foundation 5d on the metal, a string guide 8 is slipped into each hole, the flared and sheathed chamfers of the holes being first coated with cement 5d and the string guide then pressed and flared into position, as shown. This protects the edges of the sheathing at both ends of the stringing holes and provides a special four or multiple layer thickness of material at the entrance point 8f, where the awl and string in stringing the frame are pressed hard on the protective material of the string supports. By this arrangement, a thin wall for the string guide and the sheathing can be maintained, giving lightness in weight, while at the bearing point 8f where thick material is needed, the proper pad is thus provided. The string guide 8 as shown may be of the same material as the sheathing or if desired, because of its edges being exposed or because of its receiving more severe wear and usage, it can be made out of rawhide or molded material with or without textile reinforcing material 13 as indicated, and instead of being flared at the outer end, it may have a screw head similar to 5f, in which case a single layer of the sheathing can be used on the tube where jointless sheathing is used or where the ends are not lapped in the tube channel 4. In place of lapping the Pyralin or other sheathing in the channel of the tube, the edges may be butt jointed in the channel and a narrow strip formed to the width and shape of the channel cemented over the joint. Where the sheathing material is used for 8 and the material will permit, the edges of the flared ends may be folded under 8g to strengthen and protect against tearing. The choice of these arrangements and the thickness of the materials can be determined by the specific needs in varied models and different weight considerations. The cementitious coat 5d throughout can be of an elastic material designed to retain its resilience and so add resilience to the string supports and thereby the strings.

Figures 25 and 26 show a modified form of frame and throat construction. In this instance, the frame, as indicated, instead of having its changing thickness stepped off at right angles to the axis of the tube, is offset in a pointed or arrow head effect 54, not only for ornamental consideration, but to absorb the stresses, gradually, in changing the thickness of the tubing rather than more abruptly as in the case of Figure 21. This provides additional safeguard against the possible crystallizing or snapping of the thin tube walls. The arrow may point either upward or downward of the racket head and any other design may be used which distributes the change in thickness of the frame over an area, rather than making it a more abrupt step approximately in one plane at right angles to the axis of the tube.

The throat expanding element shown in these figures is formed of a flat steel spring band, which is punched and shaped to form the upper bridge member 14 and the lower opposite curved bridge member 14c and the sides 14d. The sides are preferably provided with stamped bent out prongs 55, which insert into corresponding holes in the tubular racket frame 1. The sides 14d in addition are preferably also brazed to the walls of the tube along the contacting surfaces or edges. The double spring bridge formed by 14 and 14c can be operated as described already for the previous bridge 14, or can be provided with a recoil spring element shown in this detail, which consists of a small rod 56 threaded at its lower portion on which is screwed the head of a recoil cylinder 57, which tightens the tempered steel recoil spring 58 with turning holes 57a. The other half of the recoil cylinder 59 is riveted onto the spring 14c. The metal bearing surfaces within the cylinders are lined with rubber or fibre or other non-metallic members 60, the same as 27, Figure 13. The parts of the recoil equipment are made of light metal, preferably duralumin, which is riveted on to the steel springs 14 and 14c after the racket and the spring bridges have been heat treated, and is so replaceable.

Figures 27, 28, 29, 30, 31 and 32 show an original method I have invented for making tubular metal racket frames. While these frames, already described, may be made with metal tubing in other conventional ways, the purpose of my invention is to reduce the operation almost entirely to punch press work,—something which has not hitherto been possible in the making of metal racket frames,—and so avoid the expensive processes now in vogue as already set forth.

Figure 27 shows a piece of round frame tubing 1 which is the preferred form, though other shapes such as oval, rectangular, etc. can be used. The tubing is preferably of special steel alloy. The tubing is punched for the string guide holes as shown in Figure 28. If desired all the required holes 9 can be formed with one stroke of the punch press, where a punch and die seat is provided for each hole, or it may be found desirable to punch one-half of the length of the racket head tubing at a time, making two operations on the one multiple punch die. The punch 61 preferably has a small pilot lead 62 on it. The purpose of the pilot lead is to bear on a small area of the metal tubing in advance so as to facilitate the formation of the dimples 63 on the punch side of the tube, which becomes the inner face of the racket frame. After 62 has dimpled the metal, the cutting head of the punch 61 makes the hole in combination with the die 64. The die forms a round flat ring 65 around each hole on what becomes the outside face of the racket frame, as already shown in Figure 7. It is to be understood that as the punch 61 and 62 descends into the tube 1, the whole tubing being unconfined at the sides, tends to spread and flatten out sideways. It is desirable so far as possible to raise and maintain the mounds or knobs 63ª between holes, which is formed by the dimpling 63, as these raised mounds strengthen the frame against tortion, and it is understood that the frame in Figures 25 and 21 are preferably so provided, the same as indicated in Figures 1, 12, and 15.

Figure 29 shows an alternate procedure, which precedes the punching shown in Figure 28, if used. In this step, the tube 1 is first placed in a confining die in the form of a channel 66. A grooving die 67 operated by a punch press then forms a channel on one side of the tube 68 of desired depth. It also can be variable in depth at different points of the racket to suit conditions, if so wanted. Where the tube is so channeled before punching, the punching is then done as shown in Figure 30 similar to the operation described in connection with Figure 28, and its position on the die with the channel downward preparatory to punching, is shown. After the tube has been punched and the two opposite walls brought towards each other by the punching, the tube is ready for bending. These opposite walls may touch adjacent the holes or may be held partly apart from each other, but in any event their position is sufficiently close to each other that the tube can be bent without seriously dislocating the holes or causing buckling and stretching at the weak points of the tube about the holes, as would be the case if an attempt were made to bend a round tube or one in which the walls at the holes had not been substantially collapsed towards each other. The bending, in other words, is made to more nearly approach that of a ribbon or a flat bar contrasted with a round tube. The tube is then accordingly readily bent around a form to the desired shape of the racket frame of the head and throat, without the customary and expensive methods involved in tube bending. It is then ready for the next operation shown in Figure 31.

This is performed with a flattening or molding die, the central portion of which is formed by the plate 69 formed to the exact shape of the interior area of the racket head. Around this form the punched, flattened, and bent frame 1 is placed in position on edge as shown in section. On the outer side of the forming die is an adjustable form composed of movable plates indicated in cross section by 70. Plates 70 slide inwardly to correct positions contacting end to end around and spaced away from the central form 69. The several pieces of 70 thus slide in on the supporting plate 71 to form the continuous form around and properly spaced away from the tube 1 already placed in position, as noted, around the center form 69. The die 72, operated by a punch press, is then brought down upon the upward extending face of the tube 1 and the tube pressed downward so as to assume the final position and its finished form, shown in Figure 32, shaping itself against the dies 69 and 70.

The inside and outside forming members 69 and 70, it will be observed rest on spring supports 73 and 74 so that as the upper forming member 72 presses down on the tube, the bottom supporting plate 75 exerts similar pressure on the opposite or under face of the tube and the springs 73 and 74 permit the forms to carry downward with the tube, shaping both the top and bottom tube faces simultaneously, giving the tubular frame its final shaping in the open channel between the forms 69 and 70. Thus when the forms come to final rest on the bed plate 75, the racket tube is expanded sideways to the desired cross sections and the sides previously pressed inward in punching for bending are again pressed outward and the frame completely formed. Each racket head so pressed is identical with every other one, all coming through the same molding die in this finishing process.

In order that this identity may be kept and the holes be all exactly alike in the finished rackets so that the molded string strip 5, which is made in a molded form to fit one of these rackets, shall fit the holes in all other rackets, the form plates 69 and 70 are provided with projecting pins or teeth 76 and 77, and as the tube is compressed downward by the press plate 72 so as to fill the form, the teeth 76 and 77 maintain the holes in a correct position and size so that they are all maintained of a correct diameter and in correct position. These pins may be shaped to give any desired form or size of hole and can be varied at will for any position in the racket for special holes for special conditions, as for example the holes in the inner face of the frame where the stamped hooks 37 are secured, can be slightly enlarged on the hook side by the pins 76 for those holes being so shaped. Similarly when the lock lugs 8ᵈ of the string guide shown in Figure 24 are used, the pins 77 have shoulders to form these receiving slots 9ª in the tube wall, and are also shaped to form the chamfer 82 for the screw head.

If the channel 4 is omitted in any part of the frame, the forming shoulders of 70 are correspondingly modified.

After the frame is so formed, the plates forming the outer form 70 are slipped backwards relieving the tube frame 1, and the frame is sprung off the tooth 76 and removed from the die.

As already described, the racket frame as in Figure 1 is of deeper thickness at the throat than at the outer head. To accomplish this, it is understood that the die plates 72, 69 and 70, and the bed plate 75 are formed for this convergence or other variations so that when they come to rest in the final position under the punch press, the graduating or changing thicknesses of the racket frame are produced. Similarly the distance apart of the opposing faces of the form 69 and 70 varies as desired to suit the changing width of the tubular frame. Any desired shapes can obviously be obtained in the forming in these molding dies and the tubing made to form itself under the press pressure to the prescribed and varied form at all points throughout the racket head as predetermined. It will be observed that in the typical form which also offers simplicity in die making, the surface of 72 and the corresponding bearing bed 75 are flat producing a correspondingly flat surface on the two faces of the frame. Where it is desired, however, to have the two faces of the frame convex rather than flat, the dies are correspondingly concaved to the desired shape as indicated by the dotted lines 78 and 79. Similarly in the case of the stepped off racket frames similar to Figures 21 and 25, the stepping in any desired form is properly recessed in molding the surfaces of the bearing plates 72 and 75, and also 69 and 70 where necessary, and the flattening and molding operation of the racket simultaneously produces the stepping off on the opposite faces of the frame, or maintains encircling steppings if same has already been formed in the tubing.

In Figures 33 and 34 are shown two separate methods of forming the string guide holes. In 33, the section shows the typical form that the holes receive from the punch press in Figure 28. In this instance, the punch 61 punches the holes 9 to the finished size for receiving the nipples of the stringing strip. This takes a larger hole in the tubing than would be the case if it were not necessary to insert these protecting string guides, and on that account, I use steel tubing of larger diameter than that employed in the other steel rackets on the market where the stringing is not protected and which accordingly are forced to use objectionable wire stringing. Where it may be desired, however, to employ a smaller tubing, as for example in the case of small light racket heads for squash, badminton, etc., I punch smaller holes in the tubing so as not to remove so much metal and to permit the use of tubing of smaller diameter. Then in the molding and flattening process of Figure 31, the pins 76 and 77 which are pointed or rounded to the full size of the larger finished holes capable of containing string guides, press back the edges 9ᵇ of the smaller punched holes as they are forced onto the points in the molding process. In this way, the holes in their final form reach their full required size as shown in Figure 34 for the nipple inserts, and the metal of the holes being turned inwardly by the pins 76 and 77 as indicated at 9ᵇ, and leaving more metal for strengthening purposes.

For the games of racquets, squash, squash tennis, etc., which are played within enclosed walls and on hard cement floors, it is desired, if possible, particularly where a metal racket head is employed, that there be some protection to prevent the metal head from cutting into the walls or floor, so as to injure them or the racket itself. In such case, or in any case where protection is wanted for the extremity or outward portions of the racket head, I provide a special stringing strip 80 corresponding to 5 shown in the previous figures, except that in this case, the strip is made sufficiently thick and preferably projected and rabbetted at the sides so as to extend beyond the frame channel, as noted, cover the striking surfaces, and pad the contacting portions of the frame hitting the walls or floor surfaces, at the end and outer portions of the racket. In the lower portion of the racket head, which does not come in contact with the obstructions, the stringing strip is reduced to its thin form as indicated by the dotted line 80ª, the strip being thus graduated from the thin portion into the thick portion approaching the end of the racket head. The stringing also, as noted, is protected in sinkage in a groove 81 formed in the stringing strip. Where it is desired to have the stringing strip 80 rigidly or permanently anchored within the tube after the manner of 8ᶜ, Figure 8, I provide on the walls of the nipple, the side groove locking ridges similar to those described for Figure 8 or 24, or as shown in Figure 34, lugs 82 which are sprung into place as the nipples of the stringing strip are forced into the frame holes so as to lock on the first 9ᵇ edge or between the inner and the outer 9ᵇ edges.

In Figures 35 to 41 inclusive are shown in exaggerated proportions diagrams of different forms of tubes for my racket frames, where varying proportions of depth and breadth of the tubular frame is given the finished racket head for withstanding the varying stresses at different parts of the racket or for producing different aesthetic effects in the finished rackets.

In Figures 35 and 36 a piece of preferably circular tubing 1 of constant diameter is used to form the racket frame for the racket Figure 1, the dotted lines 1ᶜ indicating its original straight form before the changing of its depth and breadth at various points in the racket frame in the final molding process already described per Figures 31 and 32. After the frame has been molded, it will be observed, as disclosed by the exaggerated diagrams, that the face of the frame is wide along the central portion of the racket head A (Figure 35) and then narrows in width as it approaches the throat or bridge point of the head B, the width then increases back to the normal size of the tube in the shanks at C and then enters the handle at D in its original round straight form. At the same time, the depth of the sides of the frame, as roughly indicated in 36, changes graduating from its minimum depth, which extends along the central portion A of the outer end, and then increases up to the maximum B at the shoulder of the racket head (see Figure 2) and reduces to the normal diameter or depth in the shank C, which is maintained in the racket handle at D.

In the case of the racket in Figure 21 where the stepped off depths are obtained while using a tube of constant diameter, the depth of the tubing, after the manner of Figures 36 and 37, is minimum along the end area at A and then tapers to a step at 48ᶠ, and then runs along straight or slightly tapered to the step-up at 48ᵉ and similarly to 48ᵈ, etc., the stepping to be repeated according to the number of steps desired, as for example 48ᶜ and ᵇ shown in Figure 21, but omitted for the sake of brevity from the typical diagram. The metal for these stepped enlargements is obtained, in this case, by the corresponding narrowing of the face as noted in Figure 35, and by the change in depth of the channel 4, the channel being deepest at the end portions A and graduating shallower to B as the tube depth is increased. After the point of the string holes 9, which weaken the tubing, are past, the depth of the tubing again decreases at 48ᵃ, the stepping descending and the tube shank being again normal at the throat and entering the racket D in its regular form. It will be observed that the shoulders of the racket adjacent the throat and bridge area which meet the greatest stroking stresses are those given a maximum depth for resistance over the area 48ᵃ to 48ᵈ of diagram 37, or correspondingly in Figure 21 the area 48ᵃ to 48ᵇ.

In the plan of racket Figure 21, it will be understood that the face of the frame can be tapered from a larger width at 48ᶠ to a smaller at A, instead of widening to the area A of Figure 35 as does the racket of Figure 1. This is optional and in the case of Figure 21 carries out the tapering or stepped effect of the rest of the racket head where that effect is wanted. This tapering in this end area 48ᶠ to A is secured by increased deepening of the channel 4 as it approaches the end of the racket taking up the excess metal secured by tapering the face. Similarly the channel gradually shallowing as it approaches the points B and C gives more metal for extending the depth of the frame at the lower joints and the step-up of the faces as already stated.

Where it is desired that this stepping should not be confined to the two faces of the racket frame, but should completely encircle the tube, straight tubing of constant diameter cannot very well be used, and a more expensive frame results. Where the extra cost is not a consideration, however, the tubing is stepped by either expanding or swaging or progressively stepped drawing so that the results of diagram Figure 38 are obtained. The frame in this case can have the channel 4 extending the full length of the stringing holes, the same as in Figures 36 and 37, or very attractive results can be obtained by using the channel for the upper end of the racket A'—A' and using holes 9 with chamfers 52 without a channel in the remaining side portions of the racket head. In this case, the standard stringing strip with extending nipples is used in the channel 4 while in the chamfered holes, the string guide 6 of the type shown in Figure 24 with or without lugs or screw locks 6ᵈ can be used. By applying the sheathing 53 with a bamboo or wood finish over the tubing and the countersunk guide heads or not, at will, as described for Figures 23, 23ᵃ and 24, a very beautiful effect can be obtained concealing the construction of the racket and giving the appearance of a light wood or bamboo frame of reduced dimensions impossible to obtain in a wooden racket of required strength.

In Figure 38, it is not necessary to change the original diameter of the tubing in order to obtain the final step off from A'—A' for the upper portion of the racket head. The reduced diameter at this point to give the step down at 83 can be secured by utilizing the metal to form the deep channel 4 over this length of the tube necessary for the stringing strip 5 and the sinkage of the strings. This saves additional swaging, drawing, or expanding and is taken care of in the molding process.

In Figure 38ᵃ, where it is desired to provide further protection against crystalizing or possible ultimate snapping of the frame at the steps 83, which are at right angles to the longitudinal axis of the tubing, I provide instead a diagonal stepping 84, those at one end of the tube pointing oppositely to those at the other end of the tube, so that when the straight tube is bent into the form of the racket head, the two sides of the head are symmetrical. These diagonal steps tend to distribute the shock to better advantage than the right angle step up.

Where a still better distribution of the shock is desired, even if at more expense, and where a further variety of aesthetic effect is sought, the stepping of the tube is done with irregular lines encompassing the tubing at each step. These can be of a variety of forms, but preferably are of a chevron form with corresponding V's on opposite sides meeting to encircle the tube. The stepping of this form gives an ideal distribution of shock and vibration resistance in the frame. Such an arrangement is shown in Figures 25 and 39 and the V's in the graduated tube form a step-up completely encircling the tube. In the use of straight tubing after the manner of Figure 37, the V's can also be formed showing prominently on the upper and lower faces of the frame and fading out on the sides after the manner of the straight steps shown in Figure 37.

Where the step effects are not required, but the increasing strength of the tapered tube to further stiffen lower portions of the racket head is desired, tapered tubes of the type of Figures 40 and 41 can be employed and can be formed from strip sheet metal cut to proper patterns folded and united with a central brazed or welded seam 85, which produce the tapered formation wanted and permit of the tube being in a single piece for its entire length, the seam being arranged to come in the channel or channel sides of the racket frame. Where a seamless tube is used, if drawn the tube can be made in two pieces with a brazed butt joint 86 backed with a concealed interior brazed nipple 87. If, however, the tapers of the tube are done by expanding the enlarged parts or of swaging the decreasing parts, the tubes can be made of a single piece without the joint 86. It will be understood that the centrally jointed, two piece tube construction can, if desired, be likewise used for rackets such as those in Figures 38 and 39, etc.

In Figure 40, the tube of changing or tapered diameter maintains a straight section at the end for entrance D to the handle 3, which facilitates the boring of the handle for fitting the tube shanks. Similarly the central portion A'—A' is maintained in straight or untapered diameter for the outer grooved end of the racket. The tube may be groved for any desired length, and preferably after the manner of the racket shown in Figure 1, otherwise after the manner of Figure 38.

In Figure 41, the tapered tube, for simplicity sake, is tapered throughout from the end to the center where the tapering reverses. In this case, the handle 3 has to be specially formed for the tapered shanks. This occasions extra expense, but offers advantage in the wedge formation of the tubing in the handle, which tends to give the handle a stronger hold on the tubing in addition to the regular pinning. The handle in such case must be of the split type of two pieces glued together on the shank rather than the straight bored single type, which can be slipped on the straight shanks in one piece, when so desired. This tube frame is, of course, also grooved where desired and preferably at the A'—A' section in any case.

Where the more elaborate forms of stepped and ornamental tubing already described are employed and the flattening and molding process, previously outlined, used, it will be understood that the molding forms 72, 75 and 69, 70 are shaped to conform to these final intended effects when the shaping of the tube is completed in Figure 32. Advantage can be taken of this in the prior swagging, expanding or drawing of the tube in its changing shapes, so that in these preliminary processes the final form need only be roughly approximated or approached and the finished lines and exact form then given in the molding step of Figures 31 and 32. This will be found particularly helpful in certain cases, making possible exact shapes, which might not otherwise be easily obtained in the aforesaid preliminary preparations of the tube.

As already outlined, it is understood that the racket frame when made is preferably special steel alloy tubing, although other metals or materials can be used. The steel alloy, which is highly desirable for strength, resistance of fatigue, and minimum size, is heat treated after coming from the finishing form 82. After being heat treated and quenched, the frame is drawn at any desired temperature for the preferred stiffness or flexibility of the frame. Where it is desired to relieve the strain on the lower portion of the head or the throat section of the frame where weakened by holes, I preferably give the shanks of the frame above D and below C, as indicated in the diagrammatic figures, a draw at a higher temperature than the rest of the frame, thereby giving a whip at the lowest point of the racket frame and a greater ductility which permits the frame to bend more at this point and relieve the points higher up weakened by holes for the stringing guides and stringing.

In Figures 42 and 43 showing a complete racket, the tubing has the straight shanks as described in connection with Figure 40 and the throat and head portions tapering to a changing diameter. The head portion is formed of tubes metallically united at A as heretofore described in combination with the metal element 28 as set forth with Figure 12, completing the built up and strongly reinforced frame and at the same time forming integrally therewith the housing socket 29 for receiving and firmly holding the handle 3. The socket 29 is provided with the pendant members 49 extending substantially downward of the handle so that with a minimum of metal the pin anchorage 21ª can pin the handle at a point of increased and substantial thickness greatly improving the strength of the union as compared with other methods and as described in connection with Figure 21.

The racket head is actuated in the expanding of the open and contractable throat by the spring bridge 14 and the extending reinforcing members 36 and likewise the recoil cylinder 25, all as described in connection with Figures 12, 13 and 16.

In Figures 44 and 45, the tubing forming the frame is provided with a changing diameter by means of stepping similar to Figure 21, but here formed on lines diagonally disposed to the axis of the tubing as in Figure 25, so as better to distribute the abrupt strains to which it is subjected in play and likewise to present a pleasing appearance to the eye. The outer portion of the frame is provided with a groove 4 in which the cushion nipple strip 5 rests keeping the stringing free from abrasion along the outer portion of the head where it often strikes the ground. This portion of the racket is similar to that described for Figures 1, 2, 3, etc. In the remaining or stepped portion of the frame, the stringing is secured and protected from the tubing by the insert nipples having the heads 51 lying flush in the formed recesses 52, all as described and shown in connection with Figure 24.

The open and contractable throat of the frame is expanded by the spring bridge member 14ᵇ as shown and described in connection with Figure 17.

The tubular frame and the handle of wood or other suitable non-metallic material are joined with the metal ferrule 2 as shown and described in connection with Figures 15 and 21, etc.

While I have shown and described my invention in a preferred form, I am aware that various changes and modifications may be made therein without departing from the principles of the invention, the scope of which may be determined by reference to the appended claims.

I claim as my invention:

1. For use in a racket, a string guide of non-metallic material for insertion in the stringing holes of the racket frame, formed with an enlarged head at one end, said head being seated in a chamfered depression in a side of the frame so as to protect the guide head from abrasive injury, hold same more securely in place, and permit the strings passing from one hole to another on the outside of the racket frame to lie in contact both with the surface of the frame and that of the guide head.

2. For use in a racket frame, a protecting string guide for insertion in the stringing holes in the frame, said guide being removable at will and being held firmly in place in the stringing hole by locking or engaging members formed on the guide.

3. In a racket for hitting games, a metallic frame encased in a non-metallic sheathing, said sheathing extending into recesses formed in the racket frame adjacent the stringing holes, and a non-metallic cushioning guide extending through said stringing holes and over-lapping the edges of said sheathing.

4. A racket frame having a flexible spring bridge spanning between the opposite sides of the frame and stringing anchored to said spring bridge.

5. A racket frame having a flexible spring bridge spanning between the opposite sides of the frame, the bridge being arched and having a thin flexible non-metallic string supporting strip in combination therewith and stringing anchored thereto.

6. In a racket for hitting games, an encased recoil spring located between and connected with the sides of the racket frame so as to be actuated by impact of the ball upon the stringing thereby increasing the resilient action of the stringing.

7. The method of forming a racket frame made of tubing whereby the holes are first formed while the tubing is in its straight or unbent form, and the tubing partially flattened, the tube being then bent to the contour of the frame while in said partially flattened condition and subsequently flattened to its final intended shape in a direction at right angles to that of the first flattening operation.

8. A method of forming a racket frame made of tubing, comprising first partially flattening or pressing the tubing in one direction, while in its straight or unbent form, by the punching of stringing holes, next bending the tubing, while thus flattened, to the form of the racket head and finally flattening or compressing the tubing at right angles to the direction of the prior flattening thereby producing its intended final form.

9. A method of manufacturing a racket frame made of tubing, comprising first channeling the tubing inwardly on one side while in its straight or unbent form, next further flattening the tubing by the punching of stringing holes in said channel, next bending the tube to the shape of the racket head and finally flattening the bent tube in a direction at right angles to the direction of the initial flattening so as to force the edge faces back toward each other again.

10. A method of making a piece of tubing in curved formation with opposing holes in opposite sides of the tube as in a tennis racket frame comprising first forming the holes while the tubing is in its straight or unbent form and flattening the tube to bring the opposite hole walls toward each other to the desired degree, then bending the tube to its intended curvature while in this flattened condition and thereafter flattening the tube in a direction at right angles to that of the first flattening to produce the final intended shape.

11. A racket for hitting games having the central longitudinal strings anchoring directly into stringing holes in the sides of the frame, these strings being relieved and protected in such anchorage by having in said stringing holes cushioning stringing guides with an enlarged head on the inner side of the frame where the central strings turn at an angle in entering the racket frame.

12. A racket for hitting games having the central longitudinal strings anchoring directly into stringing holes in the sides of the frame, these strings being relieved and protected in such anchorage by having in said stringing holes cushioning stringing guides with an enlarged head on the inner side of the frame where the central strings turn at an angle in entering the racket frame, said guide head being fitted in a chamfered recess formed therefore on the inside face of the racket frame.

13. A racket for hitting games having a flat relatively thin and flexible bridge member spanning the opening between the opposite frame members and arching towards the outer extremity of the head so as to permit the racket head to contract on ball impact on the strings by the flexing of the bridge member and thereby simultaneously relieve the shock and strain on the central longitudinal strings.

14. A racket for hitting games having a metal frame and a metal strip spanning the opening between the frame members and metallically united thereto to form a bridge piece, said metal strip being provided with extending parts integrally formed therewith for readily clinching the strip to the frame members and thereby holding same in position during brazing or the like to secure metallic union.

15. A racket for hitting games having a frame formed of a hollow metallic shell and stringing anchored in perforations therein and reinforcing metallic bands metallically united to the metallic shell at these perforations where it is desired to strengthen the shell, so weakened, against hitting stresses and increase the resilience of the frame, the stringing hole passing through both the shell and the reinforcing band.

16. For use in stringing a racket for hitting games having a tubular frame with stringing holes formed in opposing and substantially spaced apart walls thereof, a thin plastic molded band, tensilely reinforced against fracture, for supporting, cushioning and protecting the stringing, said band having long extending nipples attached thereto so formed as to pass through the stringing holes in one wall of the tube, span the interior space of the tube and reach into the corresponding aligned holes of the spaced away opposing wall, so as to furnish by application to the outer side only of the frame, complete protection of the stringing against abrasion by the cutting edges of the metal holes of both the opposing walls of the tubular frame.

17. A racket comprising a frame formed of a hollow shell, said shell forming an enclosing head with stringing woven therein and having a handle connected therewith at one end, said frame being stepped to a changed exterior thickness at right angles to the plane of the stringing without having the stepping completely circumferential of the frame shell, said stepping being symmetrically disposed on the opposite sides of and equidistant from the longitudinal axis of the racket.

18. A racket comprising a frame formed of a hollow shell, said shell defining an enclosing head with stringing woven therein and having a handle connected therewith, and having a changing exterior cross-sectional perimeter approaching an end of the racket head and symmetrically disposed on the opposite sides of the longitudinal axis of the racket, said changing perimeter changing through a series of visibly marked steps spaced apart longitudinally of the frame.

19. A racket comprising a frame formed of a hollow shell, said shell defining an enclosing head with stringing woven therein and having a handle connected therewith, and having a changing exterior cross-sectional diameter approaching an end of the racket head and symmetrically disposed on the opposite sides of the longitudinal axis of the racket, said changing diameter changing through a series of visibly marked steps spaced apart longitudinally of the frame and having shoulders located diagonally to the longitudinal axis of the hollow shell, whereby the strain shocks are more gradually absorbed at the points of increasing frame diameter.

20. A racket comprising a frame formed of a hollow shell, said shell defining an enclosing head with stringing woven therein, and having a handle connected therewith, and having a changing exterior diameter approaching an end of the racket head, and symmetrically disposed on the opposite sides of the longitudinal axis of the racket, said changing diameter changing through a series of visibly marked steps formed at other than right angles to the longitudinal axis of the line of stress transmission.

21. A racket comprising a frame formed of a hollow shell, said shell defining an enclosing head with stringing woven therein and having a handle connected therewith, and having a changing exterior diameter approaching an end of the racket head, and symmetrically disposed on the opposite sides of the longitudinal axis of the racket, said changing diameter changing through a series of visibly marked steps forming pointed or V formations on the surface of the hollow shell for graduating stress shocks.

22. A racket comprising a frame formed of a channeled tube, said tube forming an enclosing head with stringing woven therein and having a handle connected therewith at one end, the tube increasing gradually in diameter approaching the throat of the racket from the outer end, the metal wall necessary for increasing such diameter being secured in whole or part by shallowing the depth of the channel at such points, the changing diameter and channel depths being symmetrically disposed on the opposite sides of the longitudinal axis of the racket.

23. A method of fabricating a tube into a perforated curved form, comprising first partially flattening or pressing the tube in one direction while in its straight or unbent form by the punching of holes, next bending the tube while thus flattened to the curved form desired, and finally flattening or compressing the tube at right angles to the direction of the prior flattening, thereby producing its final intended form.

24. A method of fabricating a tube into a perforated bent form comprising flattening and punching the tube in one direction while in its straight or unbent form, next bending the tube while thus flattened to the desired form, and finally flattening or compressing the tube at right angles to the direction of the prior flattening, thereby producing its final intended form.

25. A racket for hitting games having a frame formed of a hollow shell spanned adjacent the throat by a flexible spring bridge piece, the racket head being contractable and the sides of the frame being brought closer together at the throat in conjunction with the flexing of the bridge piece, as distinct from mere distortion in rackets formed with the customary rigid bridge and throat and stringing anchored to the frame and said bridge piece.

26. A racket for hitting games having a frame formed of a hollow shell spanned adjacent the throat by a flexible spring bridge piece, the racket head being contractable and the sides of the frame being brought closer together at the throat in conjunction with the flexing of the bridge piece and stringing anchored to the frame and said bridge piece and cushioning material interposed between the flexible bridge piece and said stringing.

27. A racket for hitting games having a frame formed of a hollow shell with stringing holes formed therein, said shell having thin reinforcing members extending longitudinally of the shell and incorporated therewith, the reinforcement increasing in size adjacent the stringing holes where the frame is otherwise weaker, and decreasing in size between the stringing holes where the frame shell is stronger.

28. A racket for hitting games having a frame formed with a thin flexible spring bridge piece spanning the throat portion, said bridge piece having projecting flexible reinforcements extending along and incorporated with the frame, thereby increasing the strength and resilience of the frame.

29. A racket for hitting games having a frame formed of a hollow tubular shell with a groove on the outer edge thereof, the opposite walls of the tube being substantially spaced apart with stringing holes therein, a string support lying in said groove and having long extending nipples spanning the space between aligned holes of the opposite walls and projecting therein, the stringing being woven through said nipples and protected from the cutting edges of the holes.

30. In combination in a racket for hitting games, a resilient metallic frame formed of a hollow shell with stringing holes formed therein and stringing woven through said holes, a contractable throat, means for causing the throat to automatically expand after contraction, including an enlargement of the shell diameter adjacent said throat and metal reinforcements metallically united to said shell at points adjacent the throat weakened by the stringing holes, and protective and cushioning non-metallic material applied to the metal frame.

31. A racket for hitting games comprising a resilient metallic frame formed of a hollow shell with stringing holes therein and stringing woven through said holes, said frame having a flexible spring bridge and a contractable throat which can be substantially narrowed by clamping before stringing thereby making the stringing and frame abnormally resilient in combination with an increasing shell diameter approaching said throat so as to accentuate the resilient expansion of the contractable throat, metal reinforcements metallically united to the shell adjacent said throat, strengthening said shell at certain points otherwise weakened by stringing holes so as to further increase the resilient reaction of the throat, and protective and cushioning non-metallic material in combination with the metal frame.

32. A racket for hitting games comprising a resilient metallic frame formed of a hollow shell with stringing holes formed therein, said shell having a contractable throat and having a changing diameter approaching said throat, means for permitting the throat to contract and causing it to subsequently expand including exterior metal reinforcements metallically united to and extending longitudinally and annularly of the shell adjacent said throat, strengthening said shell at certain points otherwise weakened by stringing holes, and protecting material covering portions of said shell and substantially cushioning said stringing.

33. A racket comprising a resilient frame forming a contractable head which is contracted and expanded by the ball impact on the stringing in play, a flexible spring bridge piece spanning the frame adjacent the throat and stringing woven through and anchored to said frame and bridge piece, said stringing forming longitudinal and transverse stringing and having central longitudinal strings, the respective spans of which are shorter in length when the racket head is contracted than when it is expanded.

34. In a racket for hitting games, a frame formed of a hollow shell in combination with longitudinal reinforcements metallically united thereto, said reinforcements being provided with extending holding arms embracing said hollow shell.

35. A racket for hitting games comprising a tubular frame including throat extensions joined to a handle, said frame being stepped to an increasing diameter approaching the throat or bridge portion from the extremity of the head and decreasing in diameter approaching the handle from the vicinity of the throat or bridge section.

36. A racket for hitting games having a metal housing for a handle and extensions formed integrally therewith extending along the sides of the frame adjacent an open throat and forming a metallically united portion of the completed frame.

37. In a racket for hitting games, a frame comprising a hollow shell formed of a plurality of metal members joined together, certain longitudinal units of which extend outward from the head towards the handle and unite to form a housing for securing said handle, the walls of said frame having an increased mass of metal per lineal unit in the regions of the throat or inner extremity of the head as compared with the outer extremity thereof.

38. A racket for hitting games, comprising a metallic frame forming a head with an open throat and a socket for receiving a handle, the framing of the open throat being formed of a different diameter from other portions of the head.

39. A racket frame having an open throat spanned by a metallic spring like bridge capable of being moved substantially out of position with clamping pressure and tending to rebound sharply in position when the pressure is relieved, and stringing attached to said bridge piece and the head enclosing frame, and having the longitudinal stringing distributed in fan like formation converging at the outer end of the racket head.

40. A racket frame having an open throat spanned by a metallic spring like bridge capable of being moved substantially out of position with pressure and tending to rebound sharply in position when the pressure is relieved, and stringing attached to said bridge piece and head enclosing frame.

41. A racket for hitting games having a frame formed of a hollow tubular shell with a groove formed in a portion thereof, the opposite walls of portions of the shell being spaced apart, said spacing varying in different parts of the frame, aligned stringing holes formed in the opposite walls and a string support lying in said groove and having extending nipples spanning the space between the aligned holes of the opposite walls and projecting therein, and stringing woven through said nipples and protected from the cutting edges of the holes.

42. A racket for hitting games having a frame with a hollow shell with a groove formed in a portion thereof, aligned stringing holes formed in the opposite walls of the frame and a string support seated in said groove, the groove and the string support being larger adjacent said stringing holes, and string guides extending through said stringing holes and protecting the strings from the cutting edges of the holes.

43. A racket for hitting games having a head with an open throat and a tubular frame of varying cross sectional perimeter, and having a housing for a handle and extensions formed integrally with said housing forming a portion of the walls of the frame defining said open throat.

44. In a racket for hitting games, a frame comprising a hollow shell formed of a plurality of members joined together to form a head with an open throat, certain longitudinal units of the frame extending downward from the head towards the handle and uniting to form a socket for receiving said handle.

45. A racket for hitting games having a tubular frame forming a racket head with an open throat, portions of said frame being extended downward below the open throat and having enlarged terminals integral therewith united to form a housing for attaching a handle thereto.

46. A racket for hitting games having a tubular frame forming a racket head with an open throat, and having portions thereof extending below said throat metallically united to form a socket for securing a handle therein.

47. In a racket for hitting games, a frame comprising a hollow shell, said shell defining an enclosed head with stringing woven therein and an open throat, said shell being formed of a plurality of longitudinal sheet metal members metallically united, certain of said longitudinal members extending downward from above the throat portion having enlarged portions forming a socket for receiving a handle.

48. In combination in a racket for hitting games a resilient metallic frame formed of a hollow shell with stringing holes formed therein by means of a punch press and stringing woven through said holes, a contractible throat, means for causing the throat to automatically expand after contraction, including an enlargement of the shell diameter adjacent said throat and metal reinforcements metallically united to said shell at points adjacent the throat, and protective and cushioning non-metallic material applied to the metal frame and recesses in the frame in combination therewith.

49. A racket for hitting games having a metal frame formed of a hollow shell with shanks extending downwards from the head in combination with a metal housing metallically united thereto for receiving a non-metallic handle, said shanks extending into the interior of the handle, the metal housing being tapered and the end of the handle in the housing being similarly tapered and anchored in the ferrule in combination with a pin secured in the lower portion of the ferrule, the ferrule being extended substantially downward of the handle so that the location of the pin anchorage therein is at a point where the tapered handle is of increased thickness, thereby giving a more secure anchorage for the pin.

50. In a racket for hitting games, a metal frame having a channel on one side, the frame being encased with a non-metallic sheathing, the sheathing having its longitudinal edges meeting within said channel and forming a cushioning member between the stringing and the metallic frame.

51. A racket for hitting games, the frame of which has a string cushioning and supporting member, and a sheathing encasing both the frame and said string supporting member whereby the string cushioning and supporting member is held in place and the composite construction of the frame with its string supporting member concealed so as to more nearly simulate the solid frame construction of a typical wooden racket.

52. For use in forming implements for hitting games, a hollow tubular shell provided with a changing diameter spaced apart longitudinally of the shell in the form of visibly marked steps, said steps forming a series of substantially V-shaped formations whereby the strain shocks are more gradually absorbed at the point of increasing shell diameter.

ROY H. ROBINSON.